United States Patent
Kuramochi

(10) Patent No.: US 9,714,533 B2
(45) Date of Patent: Jul. 25, 2017

(54) BIAXIAL HINGE AND TERMINAL DEVICE USING THE SAME

(71) Applicant: KEM HONGKONG LIMITED, Tsimshatsui, Kowloon (HK)

(72) Inventor: Ryuta Kuramochi, Kanagawa (JP)

(73) Assignee: KEM HONGKONG LIMITED, Tsimshatsui, Kowloon (HK)

( * ) Notice: Subject to any disclaimer, the term of this patent is extended or adjusted under 35 U.S.C. 154(b) by 0 days.

(21) Appl. No.: 14/878,042

(22) Filed: Oct. 8, 2015

(65) Prior Publication Data

US 2016/0102487 A1    Apr. 14, 2016

(30) Foreign Application Priority Data

Oct. 14, 2014   (JP) ................. 2014-210298

(51) Int. Cl.
*E05D 3/06* (2006.01)
*E05D 3/12* (2006.01)
*G06F 1/16* (2006.01)

(52) U.S. Cl.
CPC .............. *E05D 3/12* (2013.01); *E05D 3/122* (2013.01); *G06F 1/1618* (2013.01); *G06F 1/1666* (2013.01); *G06F 1/1681* (2013.01)

(58) Field of Classification Search
CPC .. E05D 3/12; E05D 3/122; E05D 3/06; E05D 3/10; E05D 11/087; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/5837; Y10T 16/53864; Y10T 16/541; Y10T 16/540255; Y10T 16/533; Y10T 16/5938

See application file for complete search history.

(56) References Cited

U.S. PATENT DOCUMENTS

| 5,635,928 A | * | 6/1997 | Takagi | ................... G06F 1/1616 341/22 |
| 6,091,600 A | * | 7/2000 | Jeong | ................... G06F 1/1616 361/679.12 |

(Continued)

FOREIGN PATENT DOCUMENTS

JP    2009063039    3/2009

*Primary Examiner* — Chuck Mah
(74) *Attorney, Agent, or Firm* — Notaro, Michalos & Zaccaria P.C.

(57) ABSTRACT

In order to provide a biaxial hinge and terminal device which ensure that a first and a second casings can open and close 360 degrees relative to each other, as well as enable a keyboard portion and rubber feet to sink relative to the upper surface of the first casing, from a predetermined opening/closing angle, the biaxial hinge comprises a biaxial hinge portion and an actuating mechanism for actuating operating mechanism(s) working on keyboard and rubber feet. Further, the actuating mechanism comprises a cam part moving in association with the movement of the biaxial hinge portion and together with opening/closing operations of the first and the second casings, and a slide part of which an end contacts with the cam part. The slide part is further provided on the attaching plate attached to the first and the second hinge shafts so as to start moving from a predetermined opening/closing angle.

8 Claims, 22 Drawing Sheets

(56) References Cited

U.S. PATENT DOCUMENTS

| | | | | |
|---|---|---|---|---|
| 6,314,274 B1* | 11/2001 | Kumagai | H04M 1/0214 | 361/679.13 |
| 6,773,178 B2* | 8/2004 | Miyako | G06F 1/1616 | 400/472 |
| 7,390,983 B2* | 6/2008 | Mizuno | G06F 1/1616 | 200/333 |
| 9,021,658 B1* | 5/2015 | Yang | G06F 1/1681 | 16/366 |
| 9,299,513 B2* | 3/2016 | Nakamura | G06F 1/1666 | |
| 9,310,848 B2* | 4/2016 | Fujino | G06F 1/1681 | |
| 9,324,514 B2* | 4/2016 | Misawa | G06F 1/1616 | |
| 2004/0212955 A1* | 10/2004 | Hsieh | G06F 1/1616 | 361/679.26 |
| 2008/0109995 A1* | 5/2008 | Kuwajima | H04M 1/022 | 16/354 |
| 2010/0041448 A1* | 2/2010 | Gaddy | G06F 1/1616 | 455/575.3 |
| 2012/0096678 A1* | 4/2012 | Zhang | G06F 1/1681 | 16/302 |
| 2012/0149438 A1* | 6/2012 | Kwon | H04M 1/022 | 455/566 |
| 2012/0192381 A1* | 8/2012 | Zhang | G06F 1/1681 | 16/366 |
| 2013/0111704 A1* | 5/2013 | Mitsui | H04M 1/022 | 16/250 |
| 2013/0125809 A1* | 5/2013 | Gracyalny | G01F 23/58 | 116/228 |
| 2013/0152342 A1* | 6/2013 | Ahn | F16C 11/04 | 16/354 |
| 2013/0318746 A1* | 12/2013 | Kuramochi | G06F 1/1681 | 16/342 |
| 2014/0009874 A1* | 1/2014 | Huang | G06F 1/162 | 361/679.01 |
| 2014/0251044 A1* | 9/2014 | Hsu | G06F 1/1681 | 74/96 |
| 2015/0047152 A1* | 2/2015 | Cheng | E05D 3/122 | 16/354 |
| 2015/0227175 A1* | 8/2015 | Motosugi | G06F 1/1681 | 16/341 |
| 2015/0245511 A1* | 8/2015 | Hsu | E05D 3/122 | 74/63 |
| 2015/0362958 A1* | 12/2015 | Shang | G06F 1/1681 | 361/679.58 |
| 2016/0011632 A1* | 1/2016 | Hsu | E05D 3/122 | 16/354 |
| 2016/0032633 A1* | 2/2016 | Hsu | E05D 3/122 | 16/368 |
| 2016/0161987 A1* | 6/2016 | Jacobs | G06F 1/1662 | 361/679.11 |

* cited by examiner

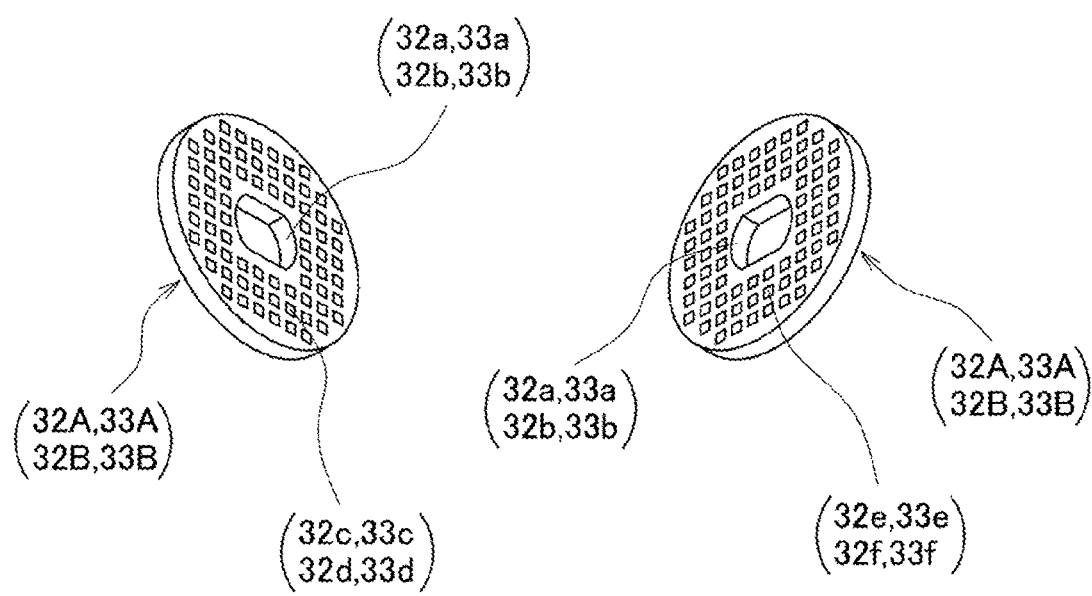

FIG. 14A
FIG. 14B
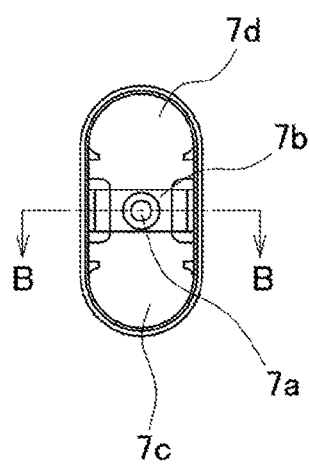
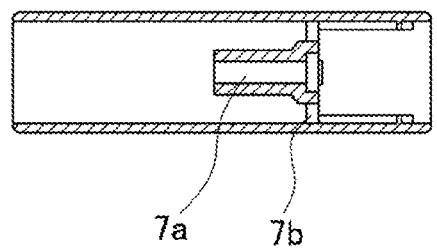

BIAXIAL HINGE AND TERMINAL DEVICE USING THE SAME

CROSS-REFERENCE TO RELATED APPLICATIONS

This application claims priority on Japanese Patent Application No. 2014-210298, filed Oct. 14, 2015, which is incorporated herein by reference in its entirety.

FIELD OF THE INVENTION

The invention relates to a biaxial hinge of a terminal device such as a notebook PC, which couples a first casing with a keyboard portion and a second casing with a display portion such that these casings can open and close 360 degrees relative to each other; the biaxial hinge is particularly suitably used in a tablet notebook PC, wherein its display portion has a touch operation function as well. The invention also relates to a terminal device using such a biaxial hinge, such as a tablet notebook PC.

BACKGROUND ART

A PC, in which a first casing with a keyboard portion and a second casing with a display portion having touch operation function using hand can open and close 360 degrees relative to each other, due to its function using a biaxial hinge, is called tablet notebook PC in general. The tablet notebook PC of this type, in which a first casing and a second casing as described above can open and close 360 degrees relative to each other, is made known by JP Laid-Open Patent Application No. 2009-063039. However, in such tablet notebook PC, a user may either use it as an ordinary notebook PC by inputting using a keyboard portion provided on the first casing, when the second casing is opened relative to the first casing, or as a tablet PC, by putting it on a table such as desk, the first casing and the second casing having rotated 360 degrees relative to each other to a folded state, and by inputting on a display portion by means of touching operation using his hand. In this case, when a terminal device is used in a folded state and a keyboard portion provided on a first casing still remains protruding from the upper surface of the first casing, a contact of the keyboard portion with a surface of the table results in erroneous operations, which is problematic. Or otherwise, when rubber feet are provided on the lower surface of the first casing, these rubber feet touch the backside of the second casing, so that the two casings cannot be folded to a horizontal position, which is again problematic. However, conventional biaxial hinges cannot solve the above-mentioned problems.

SUMMARY OF THE INVENTION

An object of the present invention is to solve the above-mentioned problems by providing a biaxial hinge which ensures that a first casing with a keyboard portion and a second casing with a display portion can open and close 360 degrees relative to each other, as well as enables a keyboard portion and rubber feet to sink relative to the upper surface of the first casing, starting from a predetermined opening and closing angle.

Moreover, the invention is also applicable to any terminal device to be potentially developed, in which not only a first casing and a second casing are coupled via a biaxial hinge in an openable and closable manner, but also operation(s) of the biaxial hinge causes other operating mechanism(s) provided on the first casing and/or the second casing to function.

To achieve the above-mentioned object, a biaxial hinge according to the invention couples a first casing on the keyboard side and a second casing on the display side such that these casings can open and close 360 degrees relative to each other; here the biaxial hinge is characterized in that it comprises a biaxial hinge portion and an actuating mechanism for actuating an operating mechanism working on a keyboard, rubber feet and others provided on the first casing; that the biaxial hinge portion comprises a first hinge shaft attached to the first casing is coupled in parallel to a second hinge shaft attached to said second casing via a plurality of joint members, such that both hinge shafts are rotatable; that the first hinge shaft and the second hinge shaft are rotatable in a synchronous manner with each other but in different directions via a synchronous rotation mechanism; that the actuating mechanism comprises: a cam member attached to the first hinge shaft, wherein the cam member is rotatable along with opening and closing operations of the first casing and said second casing; an actuating member slidable along with a rotary movement of said cam member; and elastic means for urging a sliding movement of the actuating member in one direction, wherein the actuating member actuates the operating mechanism.

Here, the invention is characterized in that a biaxial hinge portion is structured such that a first hinge shaft attached to the first casing via a first attaching plate is coupled in parallel to a second hinge shaft attached to the second casing via a second attaching plate via a plurality of joint members, whereby both hinge shafts are rotatable; that a rotation controlling mechanism of the first hinge shaft and the second hinge shaft is provided in association with the joint members; and that the rotation controlling mechanism comprises: a synchronous rotation mechanism for causing one hinge shaft to synchronously rotate in a direction different from a rotation of other hinge shaft; a friction torque generating mechanism provided on the first hinge shaft and the second hinge shaft; a sucking mechanism provided on the first hinge shaft and the second hinge shaft.

Still further, the invention is characterized in that the operating mechanism is a sinking mechanism of a keyboard portion, and that the sinking mechanism consists of a cam mechanism for moving upwards and downwards a keyboard portion holding plate, wherein a keyboard portion is provided on an upper part of the keyboard portion holding plate; thus the keyboard portion holding plate moves in association with the slide movement of the actuating member of the actuating mechanism.

Still further, the invention is characterized in that the actuating mechanism comprises: a cam member attached to the first hinge shaft, such that the cam member is rotatable together with the first hinge shaft; an actuating member being slidable along with a rotary movement of the cam member; elastic means for urging a sliding movement of the actuating member in one direction; and a joint member for linking the actuating member with the operating mechanism.

Still further, the invention is characterized in that the synchronous rotation mechanism comprises: a gear supporting member also functioning as first joint member for pivotally supporting the first hinge shaft and the second hinge shaft toward the identical direction; an intermediate gear having a lower bevel tooth portion on a lower part and an upper bevel tooth portion on an upper part, wherein the intermediate gear is pivotally supported between a lower projecting portion and an upper projecting portion in a rotatable manner; a first gear meshed with the lower bevel tooth portion, wherein the rotation of the first gear is restricted by the first hinge shaft, so that the first gear is attached to the first hinge shaft; and a second gear meshed with the upper bevel tooth portion, wherein the rotation of the second gear is restricted by the second hinge shaft, so that the second gear is attached to the first hinge shaft.

Still further, the invention is characterized in that the friction torque generating mechanism consists of a first friction torque generating mechanism and a second friction torque generating mechanism; that the first friction torque generating mechanism comprises: a friction plate also functioning as second joint member; a first A friction washer and a first B friction washer provided on both sides of the lower part of the friction plate, between the first gear of the synchronous rotation mechanism and the cam plate member of the sucking mechanism of the biaxial hinge portion, such that the first A friction washer and the first B friction washer can rotate together with the first hinge shaft; and a first elastic means provided on the first hinge shaft for bringing the first A friction washer and the first B friction washer into press contact with the friction plate and the cam plate member; and that the second friction torque generating mechanism comprises: a friction plate also functioning as second joint member; a second A friction washer and a second B friction washer provided on both sides of the upper part of the friction plate, between the second gear of the synchronous rotation mechanism and the cam plate member of the sucking mechanism of the biaxial hinge portion, such that the second A friction washer and the second B friction washer can rotate together with the second hinge shaft; and a second elastic means provided on the second hinge shaft for bringing the second A friction washer and the second B friction washer into press contact with the friction plate and the cam plate member.

Still further, the invention is characterized in that the sucking mechanism consists of a first sucking mechanism and a second sucking mechanism; that the first sucking mechanism comprises: a first A cam concave portion and a first B cam concave portion, each having substantially a circular arc shape and provided outside a third A bearing hole of the cam plate member for bearing the first hinge shaft, wherein the cam plate member is provided such that the first hinge shaft and the second hinge shaft pass through the cam plate member in a rotatable manner; a first cam follower attached to the first hinge shaft, wherein the rotation of the first cam follower is restricted by the first hinge shaft, and the first cam follower comprises a first A cam convex portion on a side facing the first A cam concave portion and a first B cam convex portion on a side facing the first B cam concave portion; and a first elastic means for bringing the first A cam concave portion into press contact with the first A cam convex portion, as well as the first B cam concave portion with the first B cam convex portion; and that the second sucking mechanism comprises: a second A cam concave portion and a second B cam concave portion, each having substantially a circular arc shape and provided outside a third B bearing hole of the cam plate member, which bears the second hinge shaft in a rotatable manner; a second cam follower attached to the second hinge shaft, wherein the rotation of the second cam follower is restricted by the second hinge shaft, wherein the second cam follower comprises a second A cam convex portion on a side facing the second A cam concave portion and a second B cam convex portion on a side facing the second B cam concave portion; and a second elastic means for bringing the second A cam concave portion into press contact with the second A cam convex portion, as well as the second B cam concave portion with the second B cam convex portion.

Still further, the terminal device according to the invention is characterized in that it uses one of the above-mentioned biaxial hinges.

Since the invention is structured as described above, a biaxial hinge according to the invention has the following advantages: when a first casing and a second casing open and close relative to each other, operating mechanism(s) such as a sinking mechanism for a keyboard portion and rubber feet start functioning, so as to ensure that the keyboard portion and the rubber feet can sink into the first casing; in this manner, when the first casing and the second casing are opened to form an opening angle of 360 degrees relative to each other, wherein the both casings overlap each other, the arrangement can prevent the keyboard portion and the rubber feet from protruding and hindering the handling and operation; moreover, the first casing and the second casing having rotated 360 degrees relative to each other via a synchronous rotation mechanism, a friction torque generating mechanism can ensure that the first casing and the second casing freely stop and maintain the position at the time of stop; and a sucking mechanism can assure an enhanced operability by allowing the both casings to automatically open and close at a predetermined angle, as well as realize an omission of a latching mechanism.

BRIEF DESCRIPTION OF THE DRAWINGS

FIGS. 11A and 11B show a friction washer of a biaxial hinge portion according to the invention, FIG. 11A being its perspective view as seen from right hand side and FIG. 11B—its perspective view as seen from left hand side;

FIGS. 14A and 14B show a hinge case of a biaxial hinge portion according to the invention, FIG. 14A being its side view and FIG. 14B—its cross sectional view in B-B line of FIG. 14A;

EMBODIMENTS

Hereinafter, reference is made based on the drawings to the embodiments in which a biaxial hinge according to the invention is applied to a tablet notebook PC. However, terminal devices using the biaxial hinge according to the invention are not limited to a tablet notebook PC, but the biaxial hinge is also applicable to other terminal devices which are assembled by coupling a first casing and a second casing by the biaxial hinge, such that the casings can open and close.

Moreover, those which a biaxial hinge according to the invention can operate are not limited to operation mechanisms such as sinking mechanism. The biaxial hinge can be used as an element for actuating various operating mechanisms provided on the first casing or the second casing.

Figure 1A:
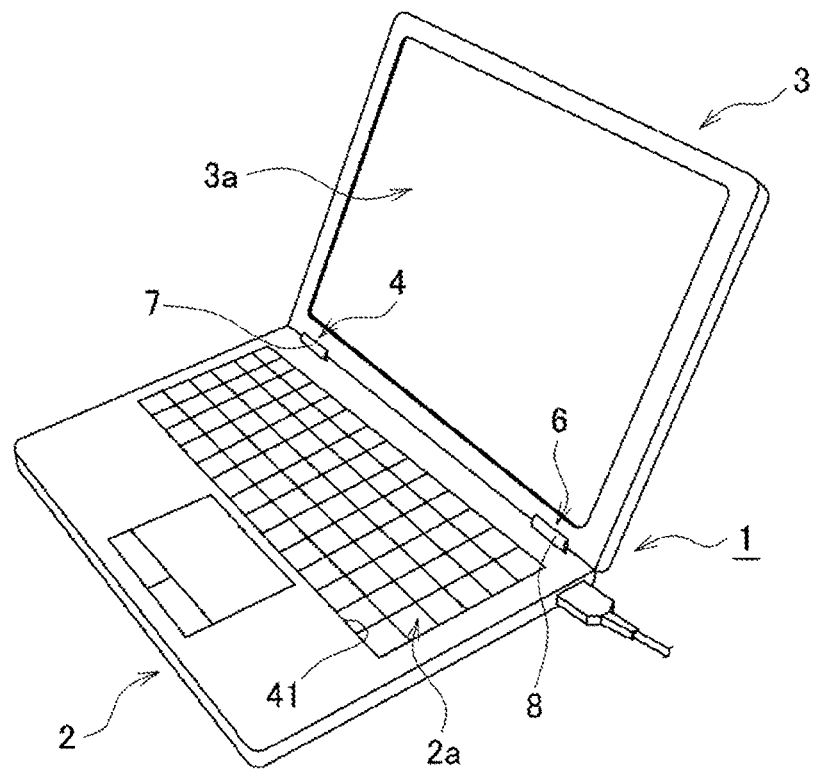
FIGS. 1A and 1B show a tablet notebook PC using a biaxial hinge according to the invention, FIG. 1A being its perspective view as seen from front side, while a first casing and a second casing are opened, and FIG. 1B being its perspective view as seen from rear side, while a first casing and a second casing are fully closed.
Figure 1B:
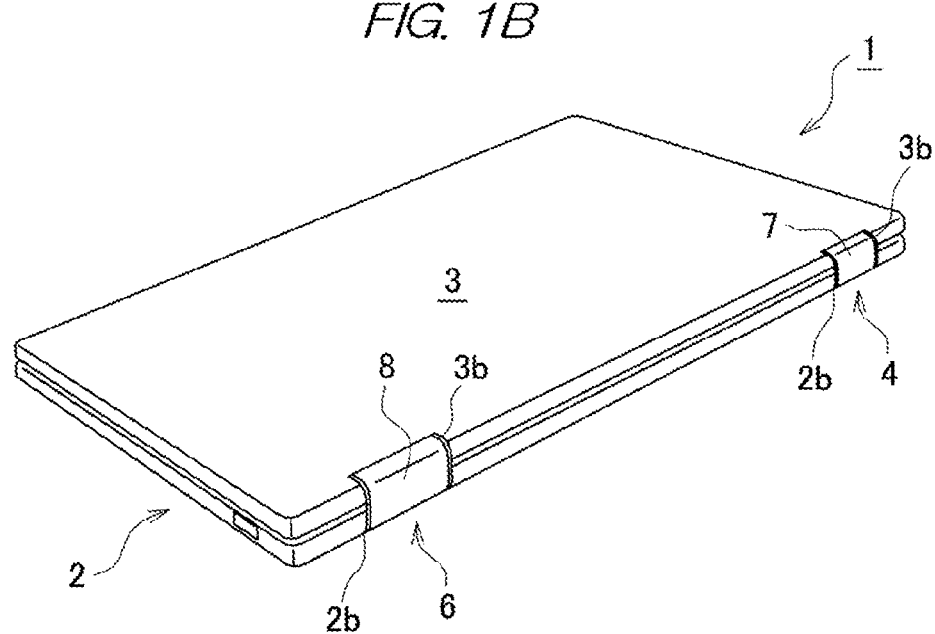

FIGS. 1A and 1B show a notebook PC 1 being an example of a terminal device using a biaxial hinge according to the invention. The notebook PC 1 comprises a first casing 2 provided with a key board portion 2a and a second casing 3 provided with a display portion 3a, wherein the casings are coupled via a pair of biaxial hinges 4 and 6 to each other at spots on the right and left sides of their respective rear portions such that the casings can open and close 360 degrees relative to each other; the display portion 3a provided on the second casing 3 is tablet-oriented, wherein it a touch-operable function by hand. Furthermore, attaching concave portions 2b, 2b are provided on the rear portion of the first casing 2 for housing the biaxial hinges 4 and 6, while attaching concave portions 3b, 3b on the rear portion of the second casing 3 for a similar purpose.

Since both biaxial hinges 4 and 6 have an identical structure except for their horizontally symmetrical arrangement, reference will be exclusively made to a biaxial hinge 4 in the following, and not to other biaxial hinge 6. Of course, biaxial hinge denoted with reference numeral 6 can be manufactured in a manner different from the biaxial hinge 4, as long as the two hinges operates with no inconvenience.

Furthermore, embodiments of a biaxial hinge portion 4a, as well as sinking mechanism 40 and an actuating mechanism 50 being examples of operating mechanism as described below are not limited to what is shown in drawings.

FIGS. 2 to 14 show an embodiment of a biaxial hinge 4 according to the invention. First, reference is made to a biaxial hinge portion 4a of the biaxial hinge 4. Particularly in FIGS. 2 to 5, a reference numeral 10 denotes a first hinge shaft of the biaxial hinge portion 4a. Particularly as shown in FIGS. 4A, 4B and 5, the first hinge shaft comprises, as seen from one end, an attaching plate portion 10a having a substantially flat cross section, wherein attaching holes 10b, 10b are provided on its surface; a flange portion 10c provided next to the attaching plate portion 10a; a first circular shaft portion 10d provided next to the flange portion 10c; a second circular shaft portion 10e provided next to the first circular shaft portion 10d with a smaller diameter than the first circular shaft portion 10d; a first deformed shaft portion 10f provided next to the second circular shaft portion 10e and finished by cutting off both sides of a simple extension of the second circular shaft portion so as to have a substantially elliptic cross section; a second deformed shaft portion 10g provided next to the first deformed shaft portion 10f and having a substantially elliptic cross section slightly thinner than the first deformed shaft portion 10f; and a male screw portion 10h provided next to the second deformed shaft portion 10g.

Figure 2:
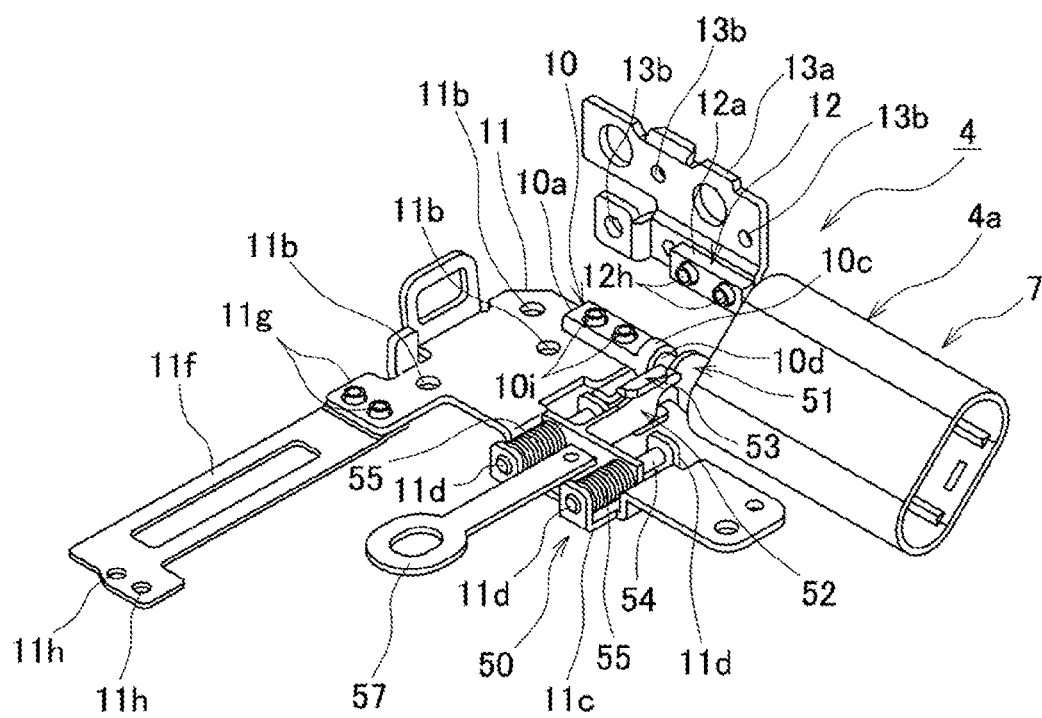
FIG. 2 shows a perspective view of a biaxial hinge according to the invention.
Figure 4A:
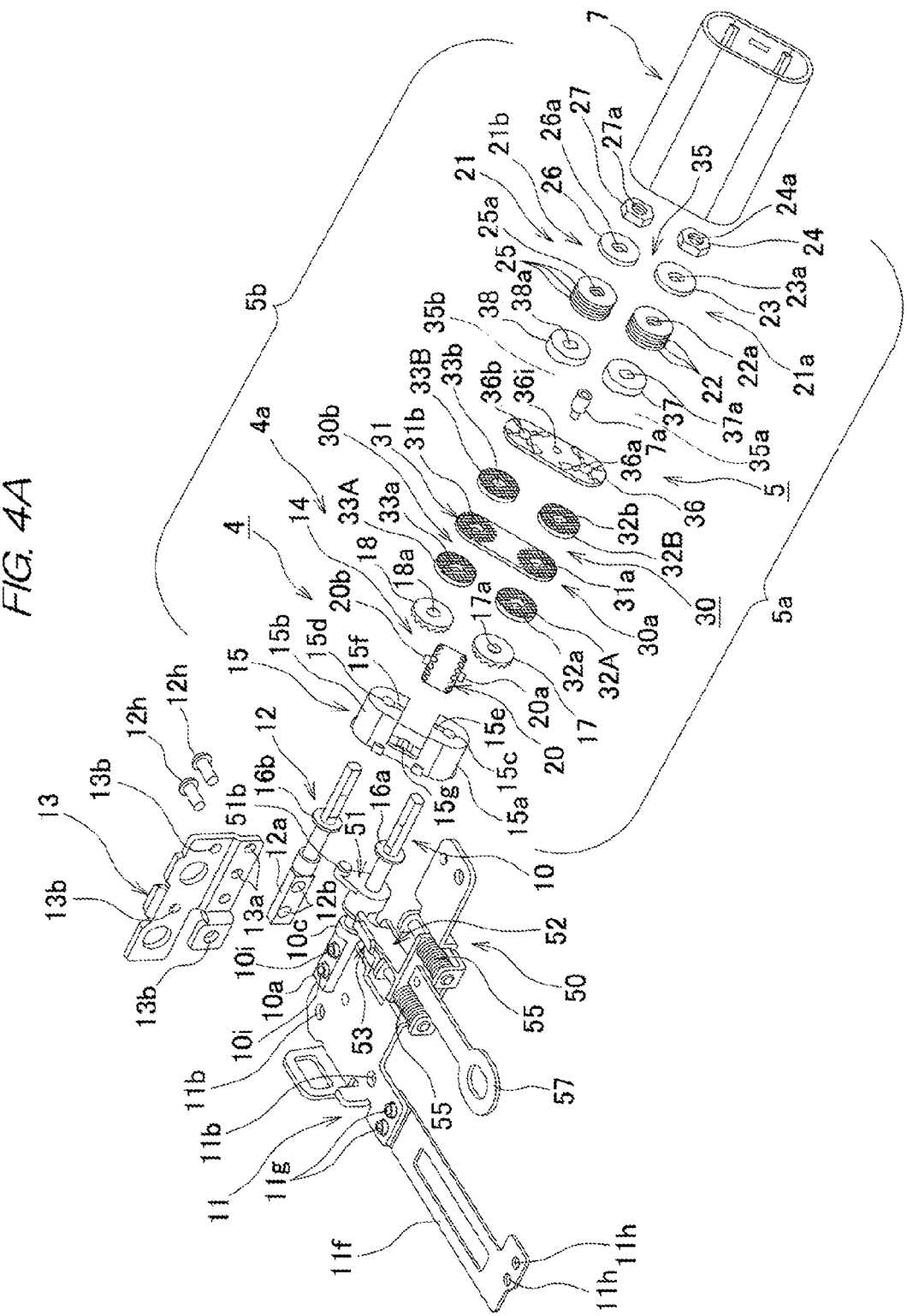
FIG. 4A shows a partially exploded perspective view of a biaxial hinge according to the invention, with a biaxial hinge portion of the biaxial hinge being exploded.
Figure 4B:
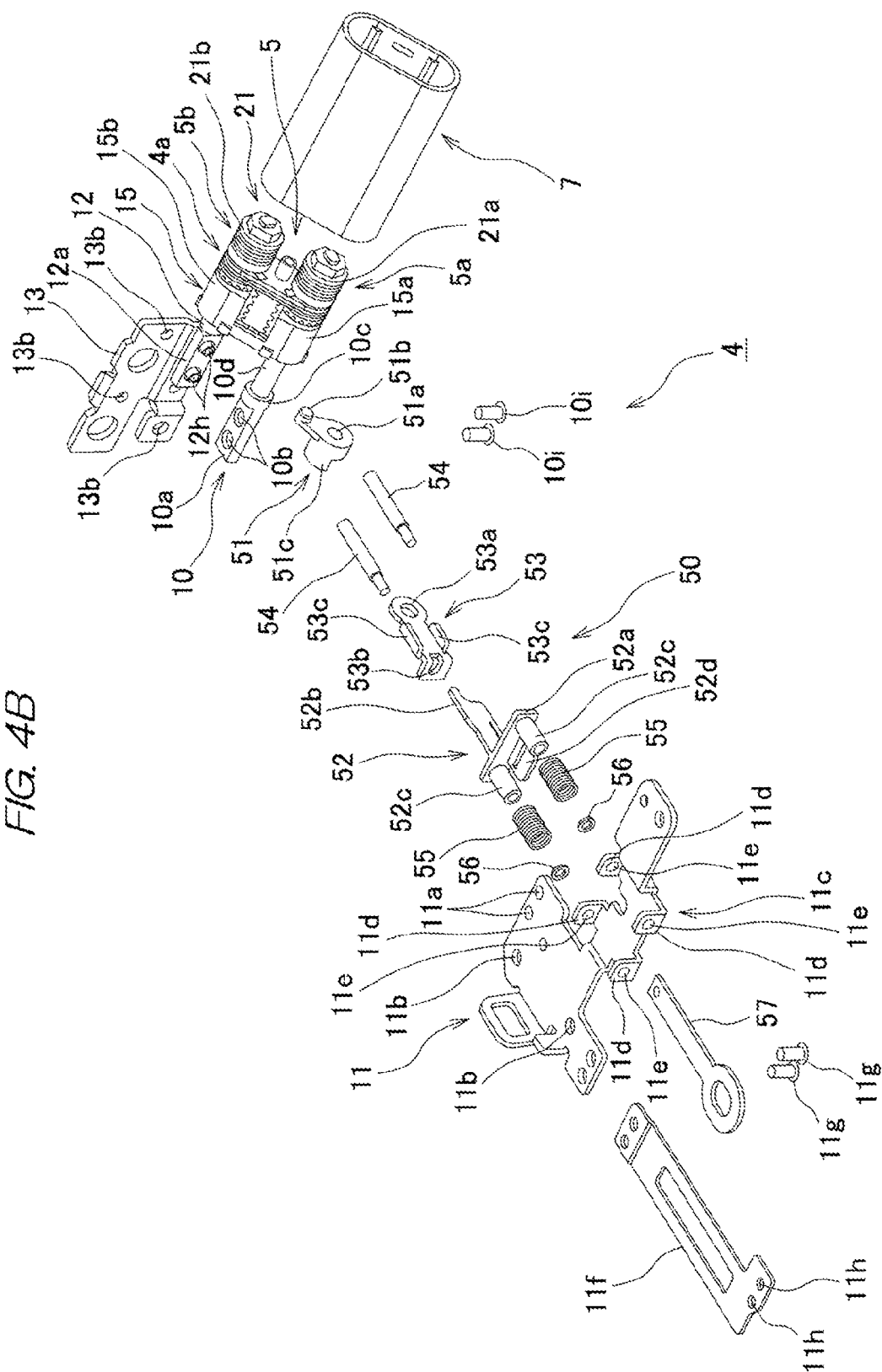
FIG. 4B shows a partially exploded perspective view of a biaxial hinge according to the invention, with an actuating mechanism of the biaxial hinge being exploded.
Figure 5A:
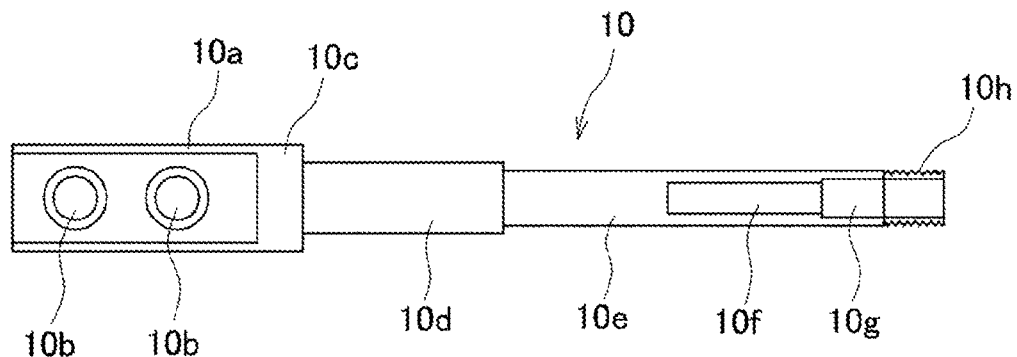
FIGS. 5A to 5C show a first hinge shaft of a biaxial hinge portion according to the invention, FIG. 5A being its plan view, FIG. 5B—its elevation view and FIG. 5C—its side view.
Figure 5B:
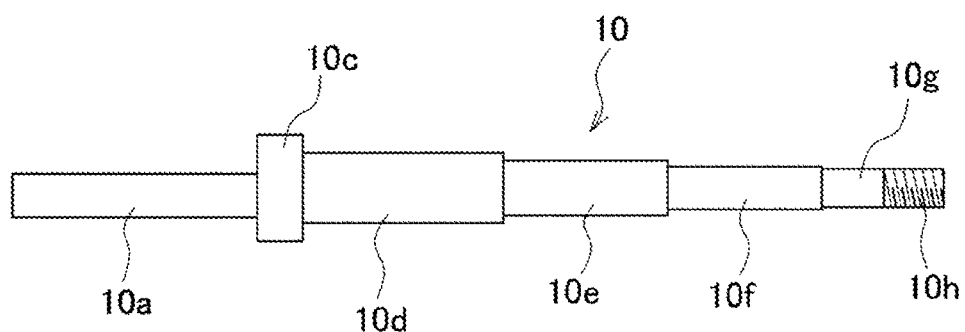
Figure 5C:
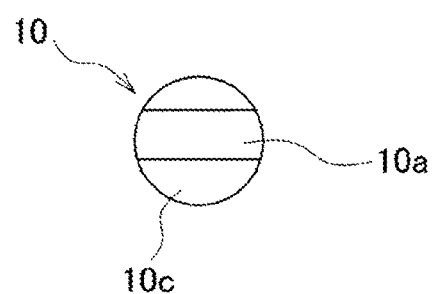

As shown in FIGS. 2 and 4A and 4B, a first attaching plate 11 is attached to an attaching plate portion 10a of a first hinge shaft 10; as per mode of attaching, the former is attached to the latter by caulking respective ends of flanged attaching pins 10i, 10i, as the attaching pins pass through two attaching holes 10b, 10b of a first hinge shaft 10 and attaching holes 11a, 11a of the first attaching plate 11. And then, especially as shown in FIGS. 2, 4A and 4B, the first attaching plate 11 is attached using attaching screws (not shown) to an upper surface side of a first casing 2 via attaching holes 11b, 11b . . . provided on the first attaching plate 11, as well as attaching holes 11h, 11h of auxiliary attaching plate 11f attached to the first attaching plate 11 via attaching pins 11g, 11g. In the meantime, attaching screws with nuts can be used instead of the attaching pins 10i, 10i.

Figure 6A:
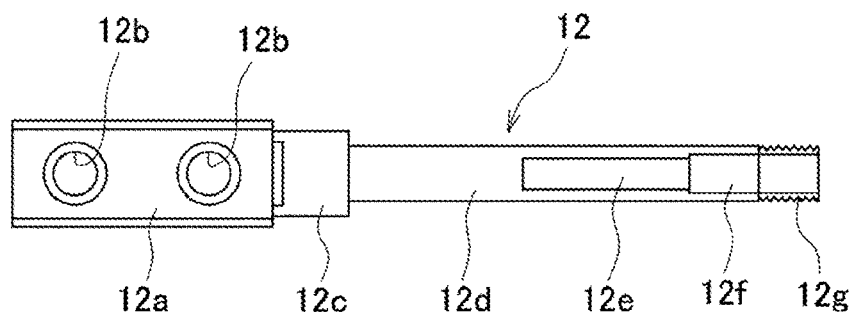
FIGS. 6A to 6C show a second hinge shaft of a biaxial hinge portion according to the invention, FIG. 6A being its plan view, FIG. 6B—its elevation view and FIG. 6C—its side view.
Figure 6B:
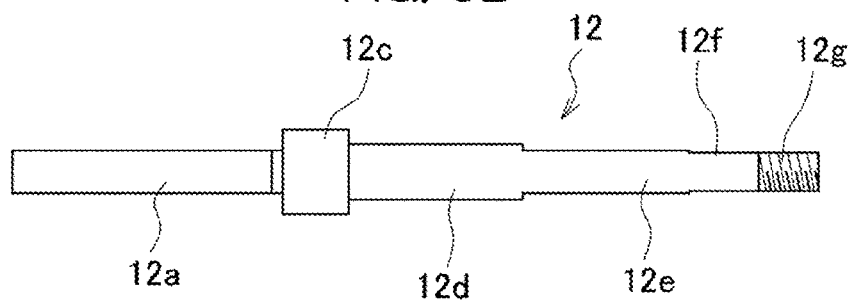
Figure 6C:
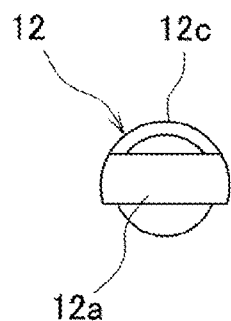
Figure 7A:
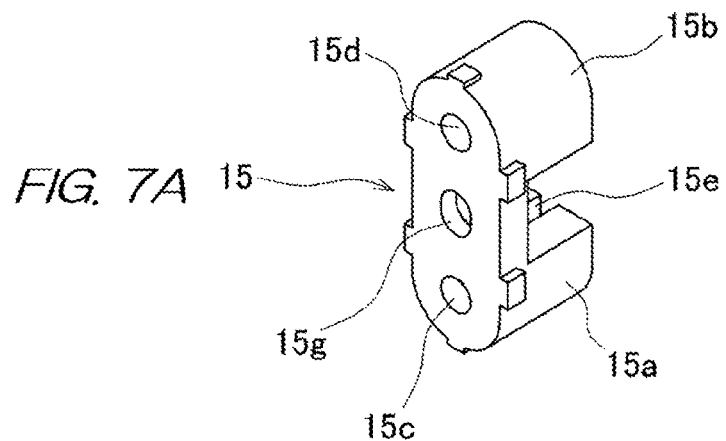
FIGS. 7A to 7C show a gear supporting member of a biaxial hinge portion according to the invention, FIG. 7A being its perspective view, FIG. 7B—its side view and FIG. 7C—its cross sectional view in A-A line of FIG. 7B.
Figure 7B:
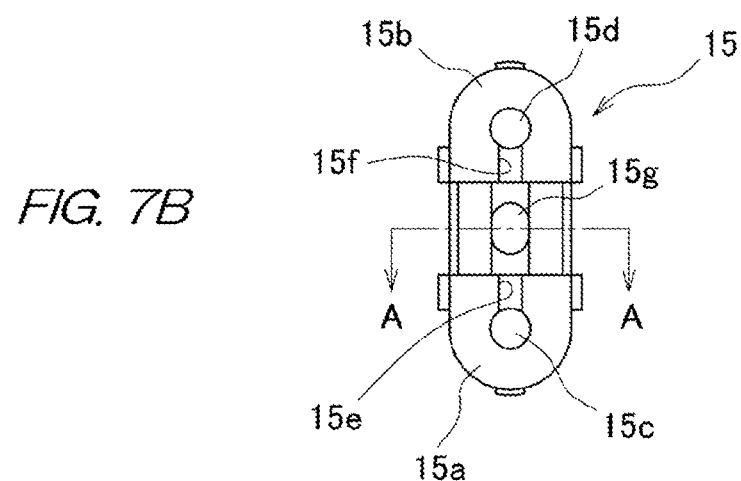
Figure 7C:
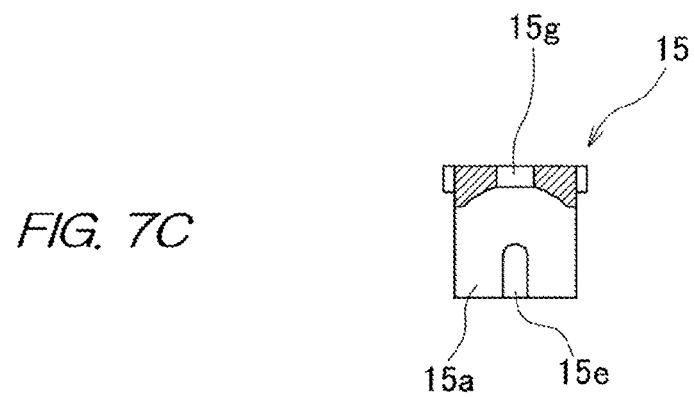
Figure 8:
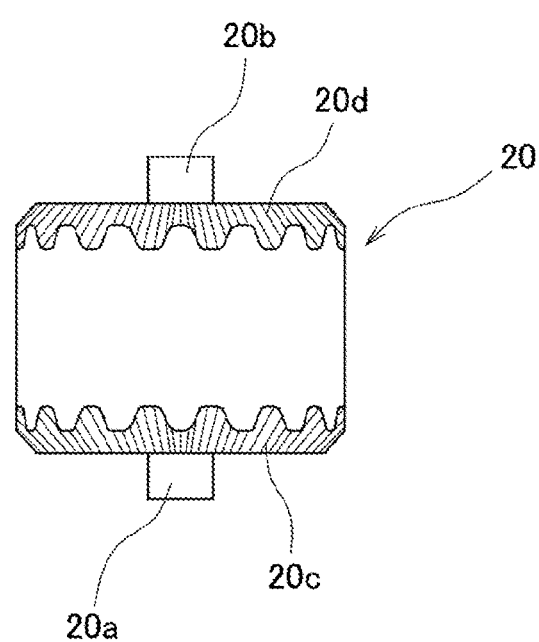
FIG. 8 shows an elevation view of an intermediate gear of a biaxial hinge portion according to the invention.

Next, particularly as shown in FIGS. 4A, 4B and 6, a reference numeral 12 denotes a second hinge shaft, which is directed upward in parallel to a first hinge shaft 10. Particularly as shown in FIG. 6, the second hinge shaft 12 comprises, as seen from one end, an attaching plate portion 12a having a substantially flat cross section, wherein attaching holes 12b, 12b are provided on its surface; a flange portion 12c provided next to the attaching plate portion 12a; a circular shaft portion 12d provided next to the flange portion 12c; a first deformed shaft portion 12e provided next to the circular shaft portion 12d and having a substantially elliptic cross section; a second deformed shaft portion 12f provided next to the first deformed shaft portion 12e and having a substantially elliptic cross section slightly thinner than the first deformed shaft portion 12e; and a male screw portion 12g provided next to the second deformed shaft portion 12f.

Figure 3:
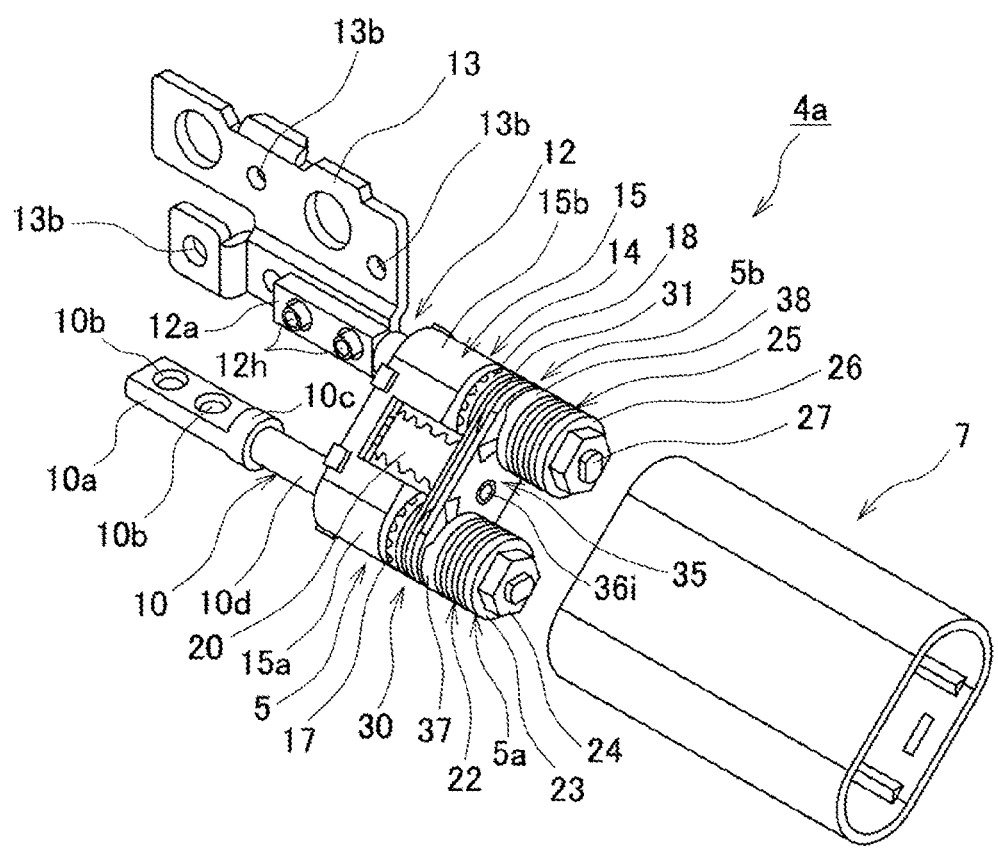
FIG. 3 shows a perspective view of a biaxial hinge according to the invention with a hinge case being removed from it.

Particularly as shown in FIGS. 3 and 4A, a first hinge shaft 10 passes through a first A bearing hole 15c provided on a gear supporting member 15 of synchronous rotation mechanism 14 also functioning as first joint member (to be described below), a second A bearing hole 31a provided on a friction plate 31 of a friction torque generating mechanism 30 also functioning as second joint member (to be described below), and a third A bearing hole 36a provided on a cam plate 36 of a sucking mechanism 35 also functioning as third joint member (to be described below), as does a second hinge shaft 12 through a first B bearing hole 15d provided on the gear supporting member 15, a second B bearing hole 31b provided on the friction plate 31, and a third B bearing hole 36b provided on the cam plate 36; the first A bearing hole 15c lies on one side of the gear supporting member 15, opposite to the first B bearing hole 15d, as does the second A bearing hole relative to the second B bearing hole 31b, as well as the third A bearing hole 36a relative to the third B bearing hole 36b; on the other hand, the first hinge shaft 10 and the second hinge shaft 12, having passed through their respective bearing holes, are able to rotate. Due to their arrangement as described above, the hinge shafts are pivotally supported in parallel to each other.

As shown in FIGS. 2 to 4A and 4B as well as FIG. 6, a second attaching plate 13 is attached to an attaching plate portion 12a; as per mode of attaching, the former is attached to the latter by caulking respective ends of flanged attaching pins 12h, 12h as the attaching pins pass through attaching holes 12b, 12b of a second hinge shaft 12 and attaching holes 13a, 13a of the second attaching plate 13. And then, the second attaching plate 13 is attached using attaching screws (not shown) to a lower surface side of a second casing 3 via attaching holes 13b, 13b . . . provided on the second attaching plate 13. In the meantime, attaching screws with nuts can be used instead of the attaching pins 12h, 12h.

Next, reference is made to a rotation controlling mechanism 5 provided between a first hinge shaft 10 and a second hinge shaft 12 of a biaxial hinge portion 4a. The rotation controlling mechanism 5 consists of a first rotation controlling mechanism 5a and a second rotation controlling mechanism 5b. The first rotation controlling mechanism 5a consists of a synchronous rotation mechanism 14, elastic means 21, a friction torque generating mechanism 30 and a sucking mechanism 35. The second rotation controlling mechanism 5b also consists of similar elements. More specifically, the first rotation controlling mechanism 5a consists of a synchronous rotation mechanism 14, a first elastic means 21a, a first friction torque generating mechanism 30a and a first sucking mechanism 35a. The second rotation controlling mechanism 5b also consists of a synchronous rotation mechanism 14, a second elastic means 21b, a second friction torque generating mechanism 30b and a second sucking mechanism 35b.

Figure 9:
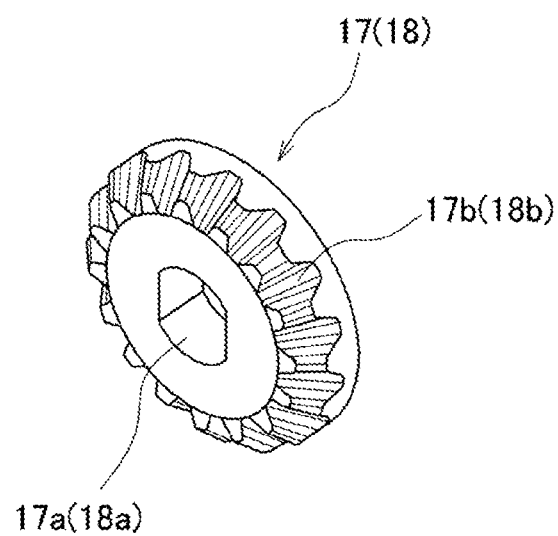
FIG. 9 shows a perspective view of a first gear and a second gear of a biaxial hinge portion according to the invention.

Therefore, reference is first made to a synchronous rotation mechanism 14. Particularly as shown in FIGS. 3, 4A, 5A, 5B, 6A and 6B, the synchronous rotation mechanism 14 comprises a gear supporting member 15 also functioning as first joint member, wherein a second circular shaft portion 10e of a first hinge shaft 10 and a circular shaft portion 12d of a second hinge shaft 12 pass through the gear supporting member in a rotatable manner; an intermediate gear 20 provided between a lower projecting portion 15a and an upper projecting portion 15b in a rotatable manner; a first gear 17 meshed with a lower bevel tooth portion 20c and a second gear 18 meshed with an upper bevel tooth portion 20d of the intermediate gear 20, wherein the first gear is attached to the first hinge shaft 10 and the second gear to the second hinge shaft 12. The gear supporting member 15 comprises a first A bearing hole 15c provided on a lower projecting portion 15a and a first B bearing hole 15d provided on an upper projecting portion 15b, wherein a second circular shaft portion 10e of a first hinge shaft 10 passes through the first A bearing hole 15c in a rotatable manner, while a circular shaft portion 12d of a second hinge shaft 12 passes through the first B bearing hole 15d in a rotatable manner. The intermediate gear 20 comprises a lower supporting shaft 20a provided coaxially with a first shaft supporting groove 15e provided on an upper side of the lower projecting portion 15a of the gear supporting member 15, and an upper supporting shaft 20b provided coaxially with a second shaft supporting groove 15f provided on a lower side of the upper projecting portion 15b of the gear supporting member 15, wherein the lower supporting shaft 20a is rotatably inserted into and supported by a first shaft supporting groove 15e, and the upper supporting shaft 20b is rotatably inserted into and supported by a second shaft supporting groove 15f. As per the first gear 17, the first deformed shaft portion 10f of the first hinge shaft 10 passes through a deformed insertion hole 17a provided in an axial direction on the center of the first gear to engage with the deformed insertion hole. And as per the second gear 18, the first deformed shaft portion 12e of a second hinge shaft 12 passes through a deformed insertion hole 18a provided in an axial direction on the center of the second gear to engage with the deformed insertion hole. In the meantime, the first gear 17 and the second gear 18 have an identical structure, so the first gear 17 only is shown in FIG. 9, the reference numeral for the second gear 18 in parentheses being just attached thereto. An elliptic hole provided substantially on the center of a gear supporting member 15 is a locking oblong hole 15g for a cam member 51 of an actuating mechanism 50 as described below. Still further, reference numerals 16a and 16b in FIG. 4A denote washers for the gear supporting member 15.

Next, reference is made to elastic means 21 provided on respective tips of a first hinge shaft 10 and a second hinge shaft 12 of a biaxial hinge portion 4a. Particularly as shown in FIGS. 4A and 4B, the elastic means 21 consist of a first elastic means 21a on the first hinge shaft side and a second elastic means 21b on the second hinge shaft side. The first elastic means 21a comprises a first elastic member 22 consisting of a plurality of disc springs, spring washers or the like, wherein a second deformed shaft portion 10g of a first hinge shaft 10 passes through a circular insertion hole 22a provided in the first elastic member, and then the disc springs or the like overlap each other; a first backing washer 23 provided next to the first elastic member 22, wherein the second deformed shaft portion 10g passes through a deformed insertion hole 23a of the first backing washer to engage with the deformed insertion hole; and a first fastening nut 24 provided next to the first backing washer 23, wherein a male screw portion 10h of the first hinge shaft 10 is screwed into a female screw hole 24a of the first fastening nut.

Particularly as shown in FIG. 4A, the second elastic means 21b comprises a second elastic member 25 consisting of a plurality of disc springs, spring washers or the like, wherein a second deformed shaft portion 12f of a second hinge shaft 12 passes through a circular insertion hole 25a provided in the first elastic member, and then the disc springs or the like overlap each other; a second backing washer 26 provided next to the second elastic member 25, wherein the second deformed shaft portion 12f passes through a deformed insertion hole 26a of the second backing washer to engage with the deformed insertion hole; and a second fastening nut 27 provided next to the first backing washer 26, wherein a male screw portion 12g of the second hinge shaft 12 is screwed into a female screw hole 27a of the second fastening nut.

Elastic means 21 as described above apply a press contact force to a friction torque generating mechanism 30 and a sucking mechanism 35, as described below, so that the former can exert a friction torque generating function while the latter a sucking function, when a first hinge shaft 10 and a second hinge shaft 12 rotate respectively.

Figure 10A:
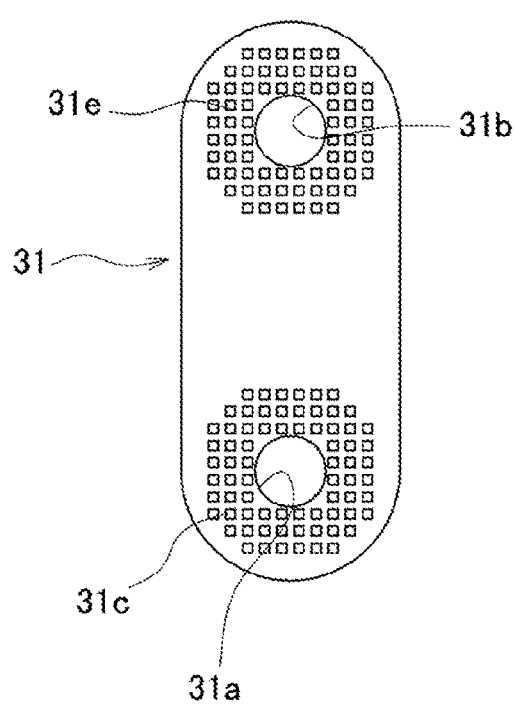
FIGS. 10A and 10B show a friction plate of a biaxial hinge portion according to the invention, which also functions as second joint member, FIG. 10A being its right hand side view and FIG. 10B—its left hand side view.
Figure 10B:
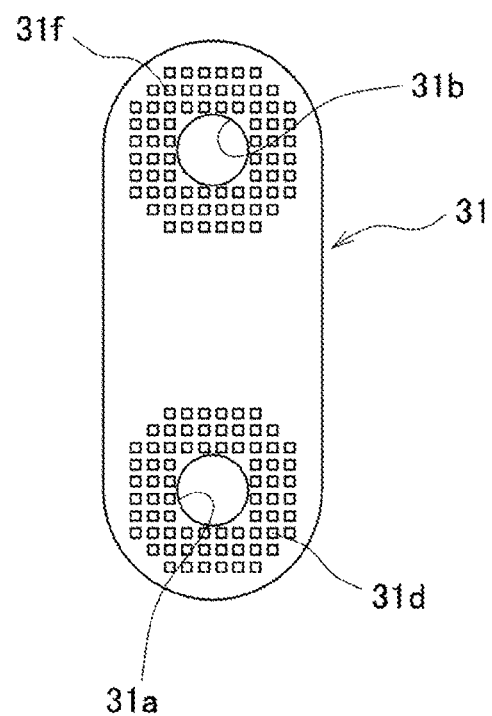

In the following, reference is made to a friction torque generating mechanism 30. Particularly as shown in FIGS. 3, 4A and 10, the friction torque generating mechanism 30 is provided next to a synchronous rotation mechanism 14, and consists of a first friction torque generating mechanism 30a on the lower part and a second friction torque generating mechanism 30b on the upper part. Particularly as shown in FIGS. 3 and 4A, a first friction torque generating mechanism 30a comprises a first A friction washer 32A, a first B friction washer 32B and a first elastic means 21a as described above. The first A friction washer 32A and the first B friction washer 32B are provided on both sides of a lower part of a friction plate 31 comprising a second A bearing hole 31a and a second B bearing hole 31b, wherein a first deformed shaft portion 10f of the first hinge shaft 10 passes through the second A bearing hole 31a in a rotatable manner, as does a first deformed shaft portion 12e of the second hinge shaft 12 through the second B bearing hole 31b; in this manner, the first A friction washer 32A and the first B friction washer 32B are assembled by allowing the first deformed shaft portion 10f of the first hinge shaft 10 to pass through a first deformed insertion hole 32a and a second deformed insertion hole 32b to engage with these deformed insertion holes.

The first A friction washer 32A is sandwiched between one side of the lower part of the friction plate 31 and a first gear 17 of a synchronous rotation mechanism 14, while the first B friction washer 32B between other side of the lower part of the friction plate 31 and one side of the lower part of a cam plate member 36 of a sucking mechanism 35. Furthermore, the first A friction washer 32A and the first B friction washer 32B rotate together with a first gear 17, when a first hinge shaft 10 starts the rotation; here the first A friction washer 32A is designed such that a friction torque is generated between the first A friction washer 32A and one side of a friction plate 31, and the first B friction washer 32B is designed such that a friction torque is generated between the first B friction washer 32B, one side of a friction plate 31 and one side of a lower part of a cam plate member 36. In this manner, both sides of the first A friction washer 32A and the first B friction washer 32B, as well as of the friction plate 31, and one side of the cam plate member 36, which are all designed for generating a friction torque, are provided with waffle-knurl pattern portions 32c, 32d; 31c, 31d; 32e, 32f; 36g, so as to enhance durability. In the meantime, a waffle-knurl pattern portion 32c on the side of the first A friction washer 32A contacting a first gear 17 can be omitted.

Particularly as shown in FIGS. 3, 4A and 10, a second friction torque generating mechanism 30b comprises a second A friction washer 33A, a second B friction washer 33B and a second elastic means 21b as described above. The second A friction washer 33A and the second B friction washer 33B are provided on both sides of an upper part of a friction plate 31 comprising a second A bearing hole 31a and a second B bearing hole 31b, wherein a first deformed shaft portion 10f of the first hinge shaft 10 and a first deformed shaft portion 12e of the second hinge shaft 12 pass through the second A bearing hole 31a and the second B bearing hole 31b in a rotatable manner; in this manner, the second A friction washer 33A and the second B friction washer 33B are assembled by allowing the first deformed shaft portion 12e of the second hinge shaft 12 to pass through a third deformed insertion hole 33a and a fourth deformed insertion hole 33b to engage with these deformed insertion holes. The second A friction washer 33A is sandwiched between one side of the upper part of the friction plate 31 and a second gear 18 of a synchronous rotation mechanism 14, while the second B friction washer 33B between other side of the upper part of the friction plate 31 and one side of the upper part of a cam plate member 36 of a sucking mechanism 35. Furthermore, the second A friction washer 33A and the second B friction washer 33B rotate together with a second gear 18, when a second hinge shaft 12 starts the rotation; here, the second A friction washer 33A is designed such that a friction torque is generated between the second A friction washer 33A and one side of a friction plate 31, and the second B friction washer 33B is designed such that a friction torque is generated between the second B friction washer 33B, one side of a friction plate 31 and one side of an upper part of a cam plate member 36.

In this manner, both sides of the second A friction washer 33A and the second B friction washer 33B, as well as of the friction plate 31, and one side of the upper part of the cam plate member 36, which are all designed for generating a friction torque, are provided with waffle-knurl pattern portions 33c, 33d; 31e, 31f; 33e, 33f; 36h, so as to enhance durability. In the meantime, a waffle-knurl pattern portion 33c on the side of the second A friction washer 33A contacting a second gear 18 can be omitted.

Next, a sucking mechanism 35 is provided next to a friction torque generating mechanism 30, more specifically between this and elastic means 21. The sucking mechanism 35 consists of a first sucking mechanism 35a below, i.e. on the first hinge shaft side and a second sucking mechanism 35b above, i.e. on the second hinge shaft side. Particularly as shown in FIG. 12, the first sucking mechanism 35a comprises a first A cam concave portion 36c and a first B cam concave portion 36d, each having a circular arc shape and provided below on one side of a third A bearing hole 36a of a cam plate member 36 also functioning as third joint member; the first sucking mechanism 35a further comprises a first cam follower 37, wherein a first deformed shaft portion 10f of a first hinge shaft 10 passes through to engage with a deformed insertion hole 37a of the first cam follower, so that the second deformed shaft portion is restrained by the deformed insertion hole; the first cam follower comprises a larger first A cam convex portion 37b and a smaller first B cam convex portion 37c, of which the first A cam convex portion is provided opposite to the first A cam concave portion 36c, and the first B cam convex portion to the first B cam concave portion 36d; the first sucking mechanism 35a further comprises a first elastic means 21a contacting the first cam follower 37 so as to bring the cam plate member 36 into press contact with the first cam follower 37.

Figure 12A:
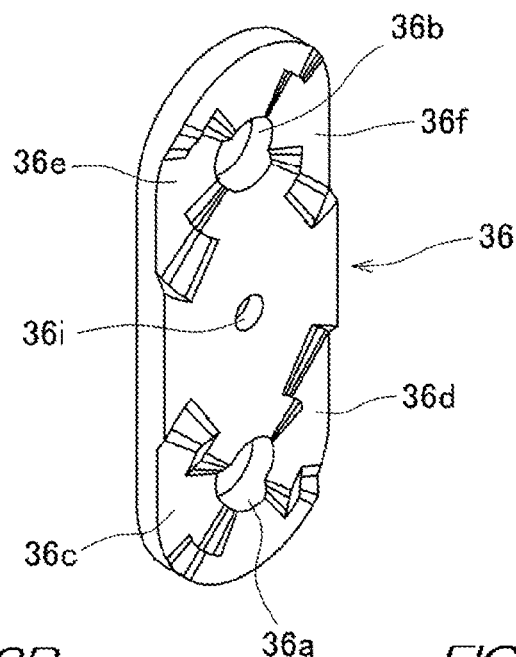
FIGS. 12A to 12C show a cam plate member of a biaxial hinge portion according to the invention, which also functions as third joint member and additional friction plate, FIG. 12A being its perspective view as seen from the sucking mechanism side, FIG. 12B—its side view as seen from the sucking mechanism side, and FIG. 12C—its side view as seen from the friction torque generating mechanism side.
Figure 12B:
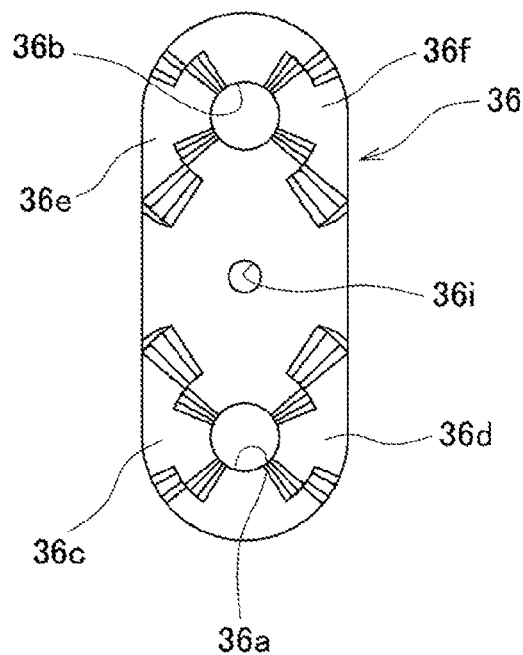
Figure 12C:
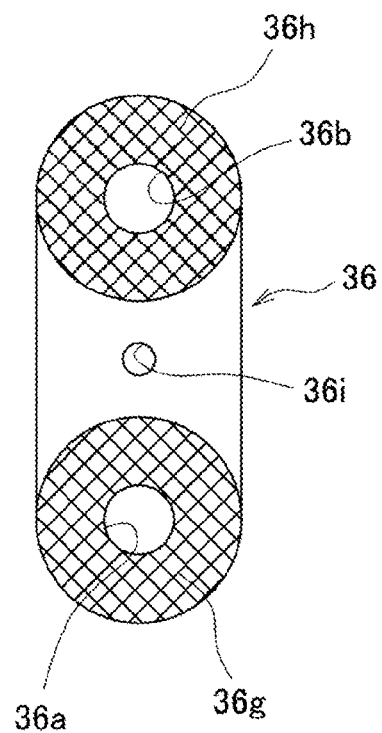
Figure 13:
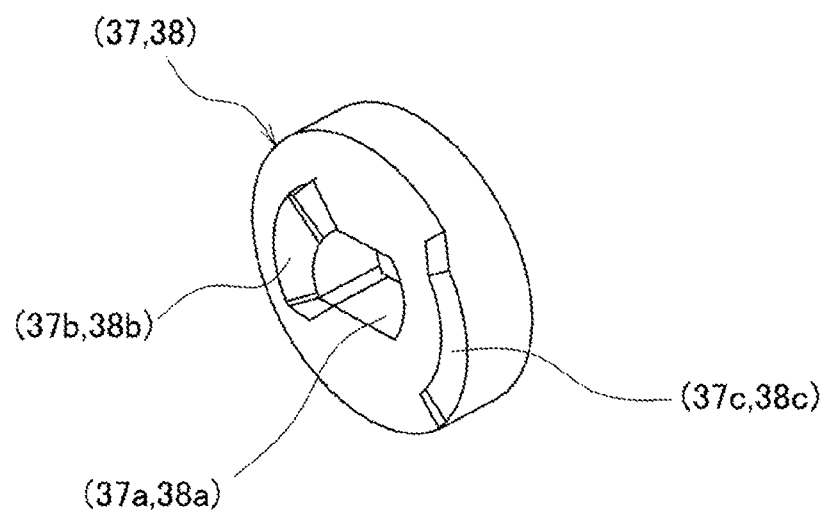
FIG. 13 shows a perspective view of a first and a second cam followers of a biaxial hinge portion according to the invention.
Figure 15A:
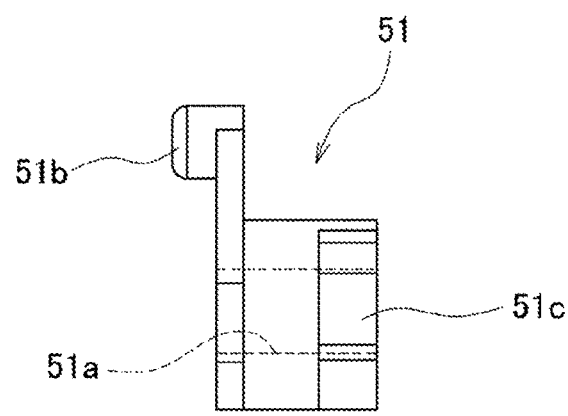
FIGS. 15A and 15B show a cam member of an actuating mechanism of a biaxial hinge portion according to the invention, FIG. 15A being its elevation view and FIG. 15B—its perspective view.
Figure 15B:
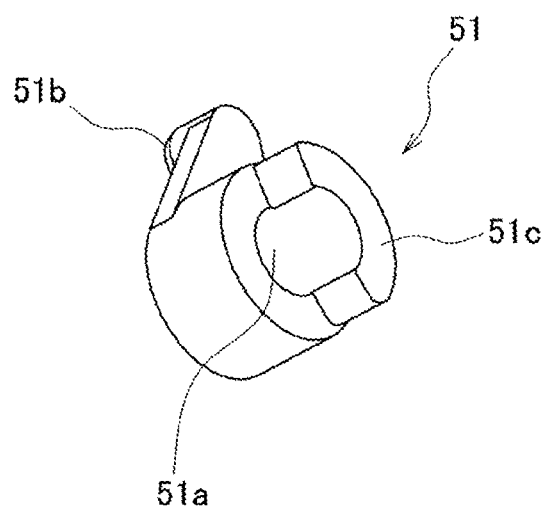

Particularly as shown in FIG. 12, the second sucking mechanism 35b comprises a second A cam concave portion 36e and a second B cam concave portion 36f, each having a circular arc shape and provided above on a third B bearing hole 36b of a cam plate member 36 also functioning as third joint member; the second sucking mechanism 35b further comprises a second cam follower 38, wherein a second deformed shaft portion 12f of a second hinge shaft 12 passes through to engage with a deformed insertion hole 38a of the second cam follower, so that the second deformed shaft portion is restrained by the deformed insertion hole; the second cam follower comprises a larger second A cam convex portion 38b and a smaller second B cam convex portion 38c, of which the second A cam convex portion is provided opposite to the second A cam concave portion 36e, and the second B cam convex portion to the second B cam concave portion 36f; the second sucking mechanism 35b further comprises a second elastic means 21b contacting the second cam follower 38 so as to bring the cam plate member 36 into press contact with the second cam follower 38. In the meantime, the rotation of the first cam follower 37 is restricted by the first hinge shaft 10 and that of the second cam follower 38 by the second hinge shaft 12, but both hinge shafts are slidable in an axial direction.

In the meantime, a cam plate member 36 also functions as a second friction plate of a friction torque generating mechanism 30 by waffle-knurl pattern portions 36g, 36h provided respectively around a third A bearing hole 36a and a third B bearing hole 36b.

In the meantime, it is recommended to attach a hinge case 7 to a biaxial hinge portion 4a, wherein the hinge case houses a rotation controlling mechanism 5 including elements from a synchronous rotation mechanism 14 to an elastic means 21. Particularly as shown in FIGS. 2, 4A and 12, the hinge case 7 has an oblong hole shaped cross section and a cylindrical shape; in the hinge case, an attaching portion 7b is provided, wherein an attaching cylindrical portion 7a is provided crossing the center of the attaching portion. The hinge case 7 houses a synchronous rotation mechanism 14, a friction torque generating mechanism 30, a sucking mechanism 35 and elastic means 21. And then, the hinge case is attached using an attaching screw (not shown) to a female screw hole 36i provided on a cam plate member 36, via an attaching cylindrical portion 7a provided on the attaching portion 7b. Moreover, the hinge case houses a synchronous rotation mechanism 14, a first friction torque generating mechanism 30a and a first sucking mechanism 35a, and a first elastic means 21a, on its lower housing portion 7c side, as does a synchronous rotation mechanism 14, a second friction torque generating mechanism 30b and a second sucking mechanism 35b, and a second elastic means 21b on its upper housing portion 7d side.

Still further, particularly as shown in FIG. 2, the hinge case 7 is housed in the attaching concave portion 2b provided on a first casing 2 and attaching concave portions 3b provided on a second casing 3, while the first casing 2 and the second casing 3 are closed. Furthermore, a hinge case 8 of another biaxial hinge 6 has an identical structure.

In the following, reference is made to a structure of a sinking mechanism 40 of a keyboard portion 2a being an example of operating mechanism. As shown in FIGS. 17A to 17E, the sinking mechanism 40 comprises a base plate 42 provided in a keyboard portion housing portion 41 provided on a first casing 2, a keyboard portion holding plate 46 provided for holding the keyboard portion 2a on the base plate 42 at a predetermined interval from the latter, a cam mechanism 43 provided between the base plate 42 and the keyboard portion holding plate 46, and an elastic member 47 for pressing the keyboard portion 2a into the keyboard portion housing portion 41. The cam mechanism 43 comprises a slide member 44 slidably provided on the base plate 42, a plurality of cam members 45, 45 . . . provided for holding the keyboard portion holding plate 46 on the slide member 44 at a predetermined interval from the latter; each of the cam members 45, 45 . . . comprises an inclined portion 45a, 45a . . . , which further comprises on its upper end a keyboard placing portion 45b, 45b . . . for placing and holding a flat keyboard portion holding plate 46. Each of the keyboard placing portions 45b, 45b . . . further comprises a locking groove portion 45c, 45c . . . ; therefore, the keyboard placing portions are designed such that they are disengaged from respective oblong hole portions 46a, 46a . . . provided on the keyboard portion holding plate 46, depending on their respective slide positions. In the meantime, the cam mechanism 43 is merely an example, and not limited to what is described in this embodiment. This embodiment can be also implemented by a linking mechanism.

Figure 16:
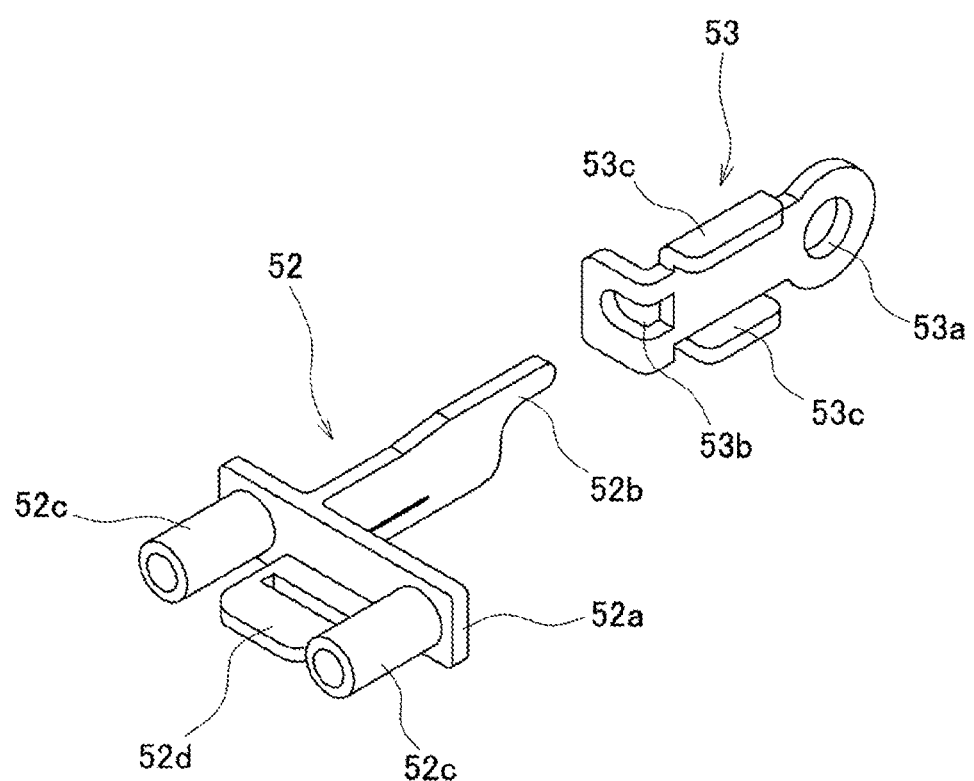
FIG. 16 shows a perspective view of an actuating member and a slide guide member of an actuating mechanism of a biaxial hinge according to the invention.

In the following, reference is made to an actuating mechanism working on a sinking mechanism 40. In this embodiment, the actuating mechanism 50 comprises a cam member 51 comprising an attaching hole 51a, through which a first hinge shaft 10 rotatably passes substantially at the center, a shaft portion 51b of which one end over the attaching hole 51a is inserted and locked into a locking hole 15g provided on a gear supporting member 15, and a cam portion 51c provided on the outer circumference toward other end and having a circular shape; particularly as shown in FIG. 16, the actuating mechanism 50 further comprises an actuating member 52 comprising a base portion 52a, a cam portion 52b projecting from one end of the base portion 52a, a pair of guide cylindrical portions 52c, 52c projecting from other end of the base portion 52a at a predetermined interval, wherein the actuating member is slidably provided between pairs of attaching pieces 11d, 11d; 11d, 11d, each pair being provided at predetermined interval on a mounting plate portion 11c provided with a drop in level from a first attaching plate 11 attached to a first hinge shaft 10; the actuating mechanism 50 further comprises a slide guide member 53 for guiding a slide movement of the actuating member 52; the actuating mechanism 50 further comprises a pair of guide pins 54, 54 attached to attaching holes 11e, 11e; 11e, 1 e, each attaching hole being provided on one of the attaching pieces 11d, 11d; 11d, 11d and pivotally installed between the attaching pieces 11d, 11d; 11d, 11d; the actuating mechanism 50 further comprises elastic members 55, 55 consisting of a pair of compression coil springs, each compression coil spring being wound about one of the guide pins 54, 54 and resiliently provided between one end of each of the attaching pieces 11d, 11d; 11d, 11d and the actuating member 52; a joint member 57 actuating the sinking mechanism 40 is attached to a joint portion 52d provided on the actuating member 52.

In the meantime, reference numerals 56, 56 denote washers for the guide pins 54, 54. Particularly as shown in FIG. 16 as well, the slide guide member 53 comprises an attaching hole 53a on its one end, wherein a first circular shaft portion 10d of a first hinge shaft 10 passes through the attaching hole; the other end of the slide guide member is folded to form a guide hole 53b; additionally, guide pieces 53c, 53c are provided at an upper and lower parts of the slide guide member. In this manner, the slide guide member is designed so as to receive an actuating member 52 between the guide pieces 53c, 53c and to guide it using them.

In the following, reference is made to the operation of the biaxial hinge 4. First, reference is made to the biaxial hinge portion 4a of the biaxial hinge 4. The biaxial hinge portion 4a allows the first casing 2 and the second casing 3 forming the tablet notebook PC 1 being an example of the terminal device to relatively open and close. The biaxial hinge portion is characterized in that the first hinge shaft 10 attached to the first casing 2 side via the first attaching plate 11 is coupled in parallel to the second hinge shaft 12 attached to the second casing 3 side via the second attaching plate 13, by means of the gear supporting member 15 of the synchronous rotation mechanism 14 also functioning as the first joint member, the friction plate 31 also functioning as the second joint member and the cam plate member 36 also functioning as the third joint member, such that hinge shaft are rotatable. When only one of the first casing 2 and the second casing 3 opens and closes relative to other, the synchronous rotation mechanism 15 simultaneously opens and closes the casing not starting opening and closing operations yet, so that the opening and closing operation can be quickly and easily accomplished.

Namely, reference is first made to how the second casing 3 which is e.g. held by one hand of the user opens from its closed state, e.g. as shown in FIG. 1B, relative to the first casing 2 which is e.g. held by another hand of the user. Here, when the second casing 3 rotates clockwise, the first hinge shaft 10 first rotates clockwise and the first gear 17 does so in the same direction (clockwise). On the other hand, when the first gear 17 rotates clockwise, the intermediate gear 20 rotates counterclockwise via the lower bevel tooth portion 20c of the intermediate gear 20 meshed with the first bevel tooth portion 17b of the first gear 17 rotating together with first hinge shaft 10, and the second gear 18 attached to the second hinge shaft 12 (in which the second bevel tooth portion 18b of the second gear 18 meshes with the upper bevel tooth portion 20d of the intermediate gear 20) rotates counterclockwise as well. In this manner, the first hinge shaft 10 rotates in a direction opposite to the rotation direction of the second hinge shaft 12, and therefore the first casing 2 rotates at the same time as the second casing 3 in a direction opposite to the rotation direction of the latter, which results in the opening and closing operation of both casings. Accordingly, as long as the first hinge shaft 10 rotates, the opening and closing operation of the first casing 2 and the second casing 3 can be more easily and quickly completed than in case of a conventional biaxial hinge portion wherein a rotation of the second hinge shaft 12 is arrested by the selective rotation restriction mechanism. In this manner, an enhanced operability is assured.

Next, reference is made to sucking operation by the sucking mechanism 35: when the first casing 2 and the second casing 3 are opened relative to each other to form an opening angle of 360 degrees, the sucking mechanism takes effect slightly before this opening angle, so that the first casing 2 and the second casing 3 are automatically opened relative to each other, in order to maintain this fully opened state. A similar movement of the first sucking mechanism 35a and the second sucking mechanism 35b also takes place when the first casing 2 and the second casing 3 move together, in order to form a closing angle of 0 degree. Still further, the sucking mechanism 35 can thus maintain the closed state of the first casing 2 and the second casing 3 without allowing the first casing 2 and the second casing 3 to automatically open relative to each other, even if no latching mechanism is provided.

Still further, the first casing 2 and the second casing 3 synchronously open relative to each other, respectively rotating toward opposite directions, via the synchronous rotation mechanism 14, so that the first casing is opened 360 degrees in total relative to the second casing. In this state, the first casing 2 overlaps the second casing 3, wherein the respective surfaces now facing each other are opposite to the ones facing each other in the closed state.

When the first casing 2 and the second casing 3 open and close relative to each other as described above, the first friction torque generating mechanism 30a and second friction torque generating mechanism 30b of the friction torque generating mechanism 30 function concurrently with each other, when the first hinge shaft 10 and the second hinge shaft 12 rotate relative to each other. Still further, the first friction torque generating mechanism 30a generates a friction torque between both sides of the lower part of the friction plate 31 and one side of the lower part of the cam plate member 36 also functioning as third joint member, together with the first A friction washer 32A and the first B friction washer 32B. Thus, the first friction torque generating mechanism 30a can accomplish a stable stopping function of the first casing 2 and the second casing 3 at any angle during their opening and closing operation.

On the other hand, the second friction torque generating mechanism 30b generates a friction torque between both sides of the upper part of the friction plate 31 and one side of the upper part of the cam plate member 36 also functioning as third joint member, together with the second A friction washer 33A and the second B friction washer 33B. Thus, the second friction torque generating mechanism 30b can accomplish a stable stopping function of the first casing 2 and the second casing 3 at any angle during their opening and closing operation.

Still further, as per the sucking mechanism 35, its first sucking mechanism 35a and the second sucking mechanism 35b start functioning slightly before the opening and closing angle of 0 and 360 degrees, so that the first A cam convex portion 37b (and the first B cam convex portion 37c, respectively) of the first cam follower 37 falls onto the first A cam concave portion 36c (and the first B cam concave portion 36d, respectively) of the cam plate member 36 also functioning as third joint member, while the second A cam convex portion 38b (and the second B cam convex portion 38c, respectively) of the second cam follower 38 falls onto the second A cam concave portion 36e (and the second B cam concave portion 36f, respectively) of the cam plate member 36 also functioning as third joint member. In this manner, the sucking mechanism 35 assumes the sucking function, in order to rotatably urge the first casing 2 and the second casing 3 in the opening direction and the closing direction in an automatic manner.

Further, the biaxial hinge 4 according to the invention assures, in addition to the original application of the notebook PC 1, a variety of additional applications, such as by synchronously rotating the first casing 2 and the second casing 3 relative to each other via the biaxial hinge 4 and folding into the shape substantially of the letter L and into the angle shape, as well as by allowing the both casings to overlap each other to form a flat tablet and turning the second casing 3 to the operator, such that the notebook PC has a function as a tablet PC.

In the following, based on the drawings, reference is made to the operation of the sinking mechanism 40 (an example of operating mechanism) of the keyboard portion 2a, as well as that of the actuating mechanism 50 actuating the sinking mechanism 40, when the first casing open relative to the second casing from the closed state of 0 degree to the state in which the both casings finally form 360 degrees.

Figure 17A:
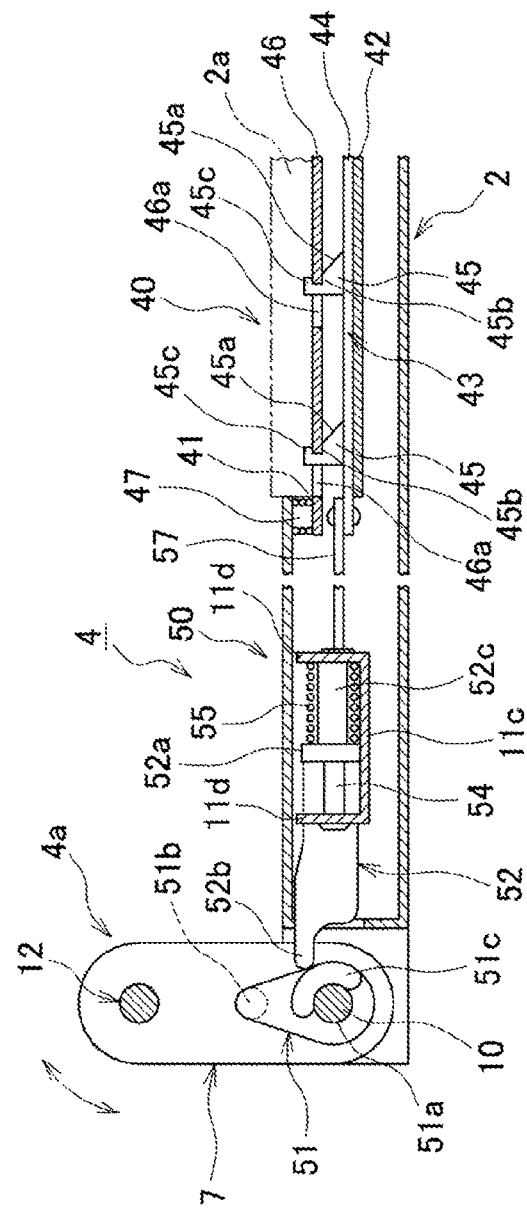
FIG. 17A is an explanatory view illustrating an operation of a sinking mechanism and an actuating mechanism (examples of an operating mechanism of a biaxial hinge according to the invention), when a first casing and a second casing form an opening and closing angle of 0 degree.

As shown in FIG. 17A, when the first casing 2 and the second casing 3 are closed to form an opening and closing angle of 0 degree, the hinge case 7 is placed in an upright position, the actuating member 52 of the actuating mechanism 50 is pressed by the cam portion 51c of the cam member 51, in order to reach to the right hand side in the drawing, against the resilient force of the elastic member 55, 55 (of which only one is shown). In this manner, the keyboard portion holding plate 46 keeps the position of the upper part of the keyboard portion 2a, in which the upper part protrudes from the upper surface of the first casing 2. This state is shown in FIG. 17A.

Figure 17B:
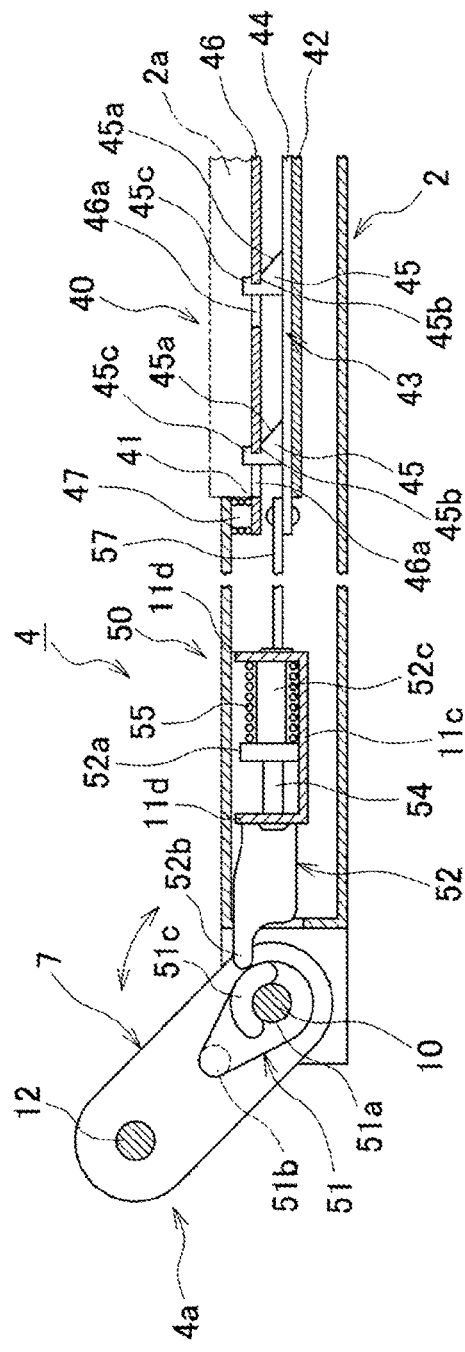
FIG. 17B is an explanatory view illustrating an operation of a sinking mechanism and an actuating mechanism (examples of an operating mechanism of a biaxial hinge according to the invention), when a first casing and a second casing form an opening and closing angle of 90 degrees.

When the first casing 2 and the second casing 3 are opened 90 degrees relative to each other from the closed state as described above, the hinge case 7 is placed in a position inclined 45 degrees counterclockwise from the upright position, the cam member accordingly rotate counterclockwise as well, as shown in FIG. 17B. Even in this state, the cam portion 52b of the actuating member 52 abuts against the cam portion 51c of the cam member 51, and the slide member 44 does not move, so that the keyboard portion holding plate 46 keeps the same position as is in the closed state of the first casing 2 and the second casing 3.

Figure 17C:
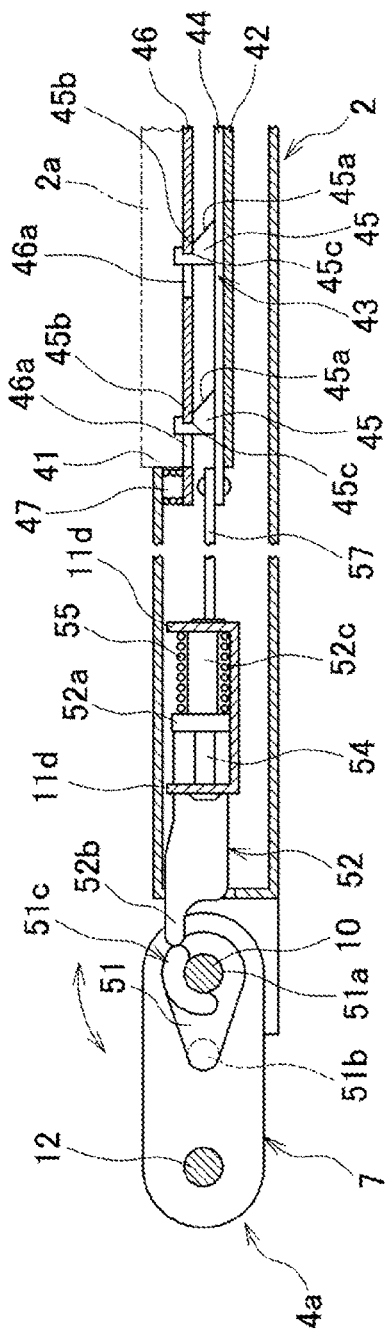
FIG. 17C is an explanatory view illustrating an operation of a sinking mechanism and an actuating mechanism (examples of an operating mechanism of a biaxial hinge according to the invention), when a first casing and a second casing form an opening and closing angle of 180 degrees.
Figure 17D:
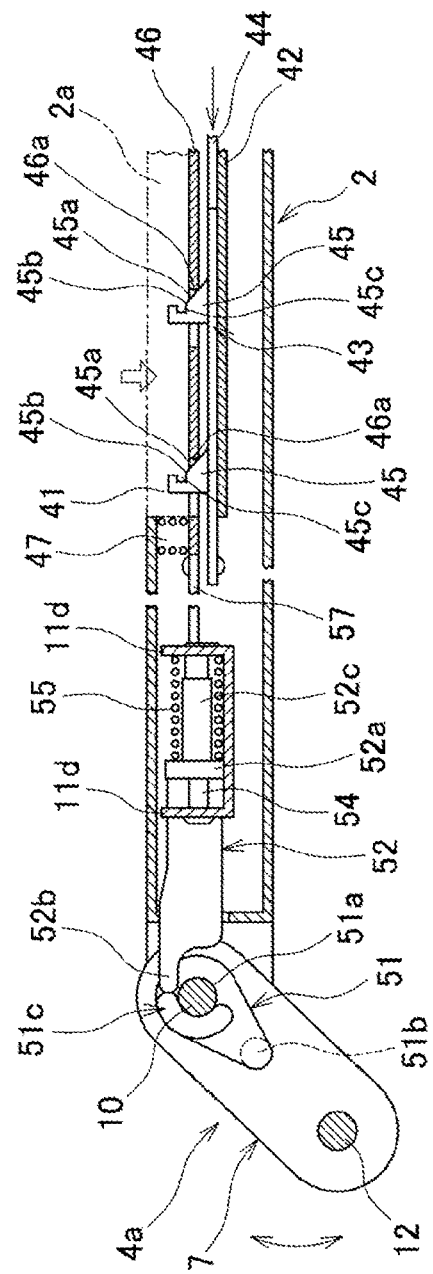
FIG. 17D is an explanatory view illustrating an operation of a sinking mechanism and an actuating mechanism (examples of an operating mechanism of a biaxial hinge according to the invention), when a first casing and a second casing form an opening and closing angle of 270 degrees.
Figure 17E:
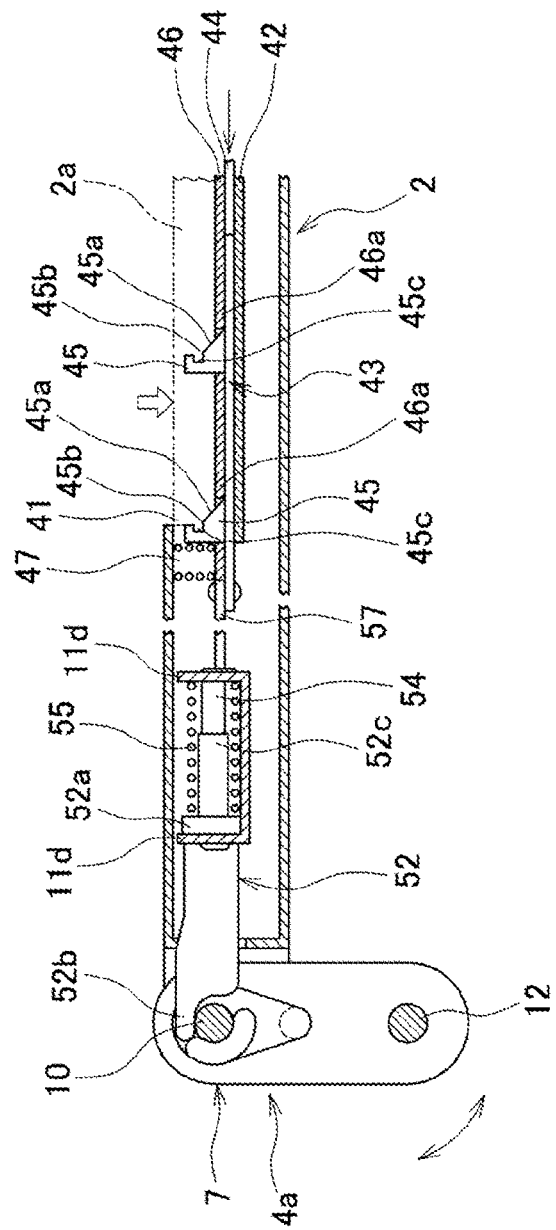
FIG. 17E is an explanatory view illustrating an operation of a sinking mechanism and an actuating mechanism (examples of an operating mechanism) of a biaxial hinge according to the invention, when a first casing and a second casing form an opening and closing angle of 360 degrees.

The actuating member 52 keeps the same position, until the first casing 2 and the second casing 3 are opened 180 degrees relative to each other, as shown in FIG. 17C. When the first casing 2 and the second casing 3 are opened more than 180 degrees relative to each other, the cam portion 52b of the actuating member 52 is detached from the cam portion 51c of the cam member 51, the actuating member 52 starts moving to the left in the drawing, due to the resilient force of the elastic member 55, 55 (of which only one is shown). In this manner, the slide member 44 being a part of the cam mechanism 43 of the sinking mechanism 40 pulled to the left in the drawing by the joint member 57, so that the keyboard portion holding plate 46 start sinking together with the keyboard portion 2a into the keyboard portion housing portion 41, via the cam members 45, 45 . . . . FIG. 17D shows the state in which the first casing 2 and the second casing 3 are opened 270 degrees relative to each other. As shown in the drawing, the keyboard portion holding plate 46 sinks together with the keyboard portion 2a into the keyboard portion housing portion 41 of the first casing 2. FIG. 17E shows the state in which the first casing 2 and the second casing 3 are further opened relative to each other, in order to finally form an opening angle of 360 degrees, i.e. the first casing 2 overlaps the second casing 3, with the respective surfaces now facing each other being opposite to the ones facing each other in the closed state. In this state, the keyboard portion holding plate 46 still sinks together with the keyboard portion 2a into the first casing 2. Therefore, when the tablet PC lies on the table, with the surface including the keyboard portion 2a facing the table surface, the above described arrangement can prevent erroneous operations of various keys on the keyboard portion 2a. The base portion 52a of the actuating member 52 is intended to restrict the width of movement of the actuating member 52 to the left, thus the actuating member 52 does not travel more than the width as covered by it during the opening operation to 270 degrees.

Next, when the first casing 2 and the second casing 3 travel in a reverse direction from the opened state to the opening angle of 180 degrees, the cam member now rotates clockwise, so that the cam portion 51c of the cam member 51 abuts against the cam portion 52b of the actuating member 52 slightly before the above-mentioned angle, in order to now press the actuating member 52 to the right in the drawing. In this manner, the slide member 44 travels to the right via the joint member 57, the keyboard portion holding plate 46 moves upwards via cam members 45, 45 . . . to raise the keyboard portion 2a upwards in the first casing 2 so that the upper part of the keyboard portion protrude from the upper surface of the first casing. The keyboard portion 2a remains protruding from the first casing 2 until the first casing 2 and the second casing 3 are closed relative to each other to finally form a closing angle of 0 degree.

In the meantime, other embodiments include, though not shown in the drawings, the use of spur gears for the first gear 17 and the second gear 18, whereby the gears are so designed that they directly mesh with each other, without intervention of an intermediate gear. Still further, the first gear 17 and the second gear 18 can be designed such that they synchronously rotate in opposite directions. Still further, a first elastic member 22 and a second elastic member 25 used for the elastic means 21 can be replaced with compression coil springs or the ones made of elastic materials, i.e. synthetic resin such as rubber. Still further, even without the hinge cases 7, 8, the function of the biaxial hinges 4, 6 is not particularly impaired, but the hinge cases 7, 8 in use have an advantage that the biaxial hinges 4, 6 as attached to the notebook PC 1 have a neat appearance, since the hinge cases prevent the synchronous rotation mechanism 14, the friction torque generating mechanism 30, the sucking mechanism 35 and others from an exposure to the outside.

Still further, the operating mechanism according to the invention can actuate not only the sinking mechanism 40 of the keyboard portion 2a, but also the sinking mechanism of rubber feet provided on the first casing 2 or other operating mechanism, as explained above.

The present invention is constructed as described above, so that it is suitable for use in a terminal device such as a notebook PC and the like, wherein a first casing and a second casing synchronously open relative to each other, and both casings open and close relative to each other in a range of 360 degrees. The present invention is particularly suitable for use in a tablet PC, among various notebook PCs.

What is claimed is:

1. A biaxial hinge of a terminal device, consisting of tablet notebook PC, which couples a first casing on the keyboard side and a second casing on the display side, thereby these casings being openable and closable 360 degrees relative to each other via said biaxial hinge, said biaxial hinge comprising a biaxial hinge portion and an actuating mechanism for actuating an operating mechanism working on a keyboard or rubber feet provided on said first casing;

said biaxial hinge portion comprising:

a first hinge shaft attached to a first actuating plate mounted on said first casing; and a second hinge shaft attached to a second actuating plate mounted on said second casing, said first hinge shaft being coupled in parallel to said second hinge shaft via a plurality of joint members, said first hinge shaft and said second hinge shaft being rotatable in a synchronous manner with each other but in different directions via a synchronous rotating mechanism;

said first hinge shaft and said second hinge shaft being rotatable in a synchronous manner with each other but in different directions via a synchronous rotation mechanism;

said synchronous rotation mechanism comprising:

a gear supporting member which passed through said first hinge shaft and said second hinge shaft in a rotatable manner, an intermediate gear provided between a lower projecting portion and an upper projecting portion of said supporting member in a rotatable manner;

a first gear attached to the first hinge shaft and meshed with a lower bevel tooth portion of said intermediate gear; and a second gear attached to the second hinge shaft and meshed with an upper bevel tooth portion of the intermediate gear;

said actuating mechanism comprising:

a cam member attached to said first hinge shaft, said cam member being rotatable together with opening and closing operations of said first casing and said second casing;

an actuating member slidably mounted on said first actuating plate along with said cam member; and elastic means interposed between said actuating member and said first actuating plate for urging a sliding movement of said actuating member in one direction, said actuating member abutting against said cam member and actuating said operating mechanism.

2. The biaxial hinge according to claim 1, said first hinge shaft of said biaxial hinge portion being attached to said first casing via a first attaching plate, and said second hinge shaft being attached to said second casing via a second attaching plate, and said first hinge shaft being coupled in parallel to said second hinge shaft of said biaxial hinge portion via a plurality of joint members which rotatable inserted said first hinge shaft and said second hinge shaft;

a rotation controlling mechanism of said first hinge shaft and said second hinge shaft being provided in association with said joint members;

said rotation controlling mechanism comprising:

a synchronous rotation mechanism comprising a gear supporting member which passed through said first hinge shaft and said second hinge shaft in a rotatable manner, an intermediate gear provided between a lower projecting portion and an upper projecting portion of said supporting member in a rotatable manner, a first gear attached to the first hinge shaft and meshed with a lower bevel tooth portion of said intermediate gear, and a second gear attached to the second hinge shaft and meshed with an upper bevel tooth portion of the intermediate gear;

a friction torque generating mechanism consisting of a first friction torque generating mechanism and a second friction torque generating mechanism each provided on said first hinge shaft and said second hinge shaft for each energize rotation in one direction;

a sucking mechanism provided both on said first hinge shaft and said second hinge shaft for each energize rotation in one direction.

3. The biaxial hinge according to claim 2, said synchronous rotation mechanism comprising:

a gear supporting member also functioning as first joint member for pivotally supporting said first hinge shaft and said second hinge shaft;

an intermediate gear having a lower bevel tooth portion on a lower part and an upper bevel tooth portion on an upper part, said intermediate gear being pivotally supported between a lower projecting portion and an upper projecting portion in a rotatable manner;

a first gear meshed with said lower bevel tooth portion, the rotation of said first gear being restricted by said first hinge shaft, thereby said first gear being attached to said first hinge shaft; and a second gear meshed with said upper bevel tooth portion, the rotation of said second gear being restricted by said second hinge shaft, thereby said second gear being attached to said second hinge shaft.

4. The biaxial hinge according to claim 2, said friction torque generating mechanism consisting of a first friction torque generating mechanism and a second friction torque generating mechanism, said first friction torque generating mechanism comprising:

a lower portion of a friction plate also functioning as second joint member;

a first A friction washer and a first B friction washer provided on both sides of said lower portion of said friction plate, between a first gear of said synchronous rotation mechanism and said cam plate member of said sucking mechanism of said biaxial hinge portion, such that said first A friction washer and said first B friction washer are rotatable together with said first hinge shaft; and a first elastic means provided on said first hinge shaft for bringing said first A friction washer and said first B friction washer into press contact with said friction plate and said lower portion of said cam plate member;

said second friction torque generating mechanism comprising:

an upper portion of said friction plate also;

a second A friction washer and a second B friction washer provided on both sides of said upper portion of said friction plate, between a second gear of said synchronous rotation mechanism and said cam plate member of said sucking mechanism of said biaxial hinge portion, such that said second A friction washer and said second B friction washer are rotatable together with said second hinge shaft; and a second elastic means provided on said second hinge shaft for bringing said second A friction washer and said second B friction washer into press contact with said friction plate and said upper portion of cam plate member.

5. The biaxial hinge according to claim 2, said sucking mechanism consisting of a first sucking mechanism and a second sucking mechanism, said first sucking mechanism comprising:

a first A concave portion and a first B concave portion, each having substantially a circular arc shape and provided outside a lower bearing hole of a cam plate member for bearing said first hinge shaft in a rotatably manner;

a first cam follower attached to said first hinge shaft, the rotation of said first cam follower being restricted by said first hinge shaft, said first cam follower comprising a first A convex portion and a first B convex portion on a side facing said first A concave portion and said first B concave portion; and a first elastic means for bringing said first A concave portion into press contact with said first A convex portion, as well as said first B concave portion with said first B convex portion;

said second sucking mechanism comprising:

a second A concave portion and a second B concave portion, each having substantially a circular arc shape and provided outside on one side of an upper bearing hole of said cam plate member being provided by bearing said second hinge shaft in a rotatable manner;

a second cam follower attached to said second hinge shaft, the rotation of said second cam follower being restricted by said second hinge shaft, said second cam follower comprising a second A convex portion and a second B convex portion on a side facing said second A concave portion and said second B concave portion; and a second elastic means for bringing said second A concave portion into press contact with said second A convex portion, as well as said second B concave portion with said second B convex portion.

6. The biaxial hinge according to claim 1, said operating mechanism being a sinking mechanism of a keyboard portion, said sinking mechanism consisting of a cam mechanism comprising a slide member slidably provided on the base plate, a plurality of cam members provided for holding the keyboard portion holding plate on the slide member at a predetermined interval from the latter for moving upwards and downwards a keyboard portion holding plate, a keyboard portion being provided on an upper part of said keyboard portion holding plate, said keyboard portion holding plate moving in upper direction and lower direction in association with said slide movement of said actuating member of said actuating mechanism.

7. The biaxial hinge according to claim 1, said actuating mechanism comprising:

a cam member attached to said first hinge shaft, thereby said cam member being rotatable together with said first hinge shaft;

an actuating member being slidably mounted on said first actuating plate mounted on said first casing along with a rotary movement of said cam member;

elastic means interposed between said first actuating plate and said actuating plate for urging a sliding movement of said actuating member in one direction; and a joint member for linking said actuating member with said operating mechanism.

8. A terminal device using the biaxial hinge according to claim 1.

\* \* \* \* \*